United States Patent
Spaidal et al.

(10) Patent No.: US 10,430,053 B1
(45) Date of Patent: Oct. 1, 2019

(54) EDGE NAVIGATION MECHANISM THAT MIMICS THE USE OF A FLIPCHART

(71) Applicant: QuirkLogic, Inc., Calgary (CA)

(72) Inventors: Christopher Bradley Spaidal, Calgary (CA); Alfonso Fabian de la Fuente, Victoria (CA); Michael Howatt Mabey, Calgary (CA); Kevin John Deevey, Calgary (CA)

(73) Assignee: QuirkLogic, Inc., Calgary (CA)

( * ) Notice: Subject to any disclaimer, the term of this patent is extended or adjusted under 35 U.S.C. 154(b) by 116 days.

(21) Appl. No.: 15/398,158

(22) Filed: Jan. 4, 2017

Related U.S. Application Data

(60) Provisional application No. 62/275,089, filed on Jan. 5, 2016.

(51) Int. Cl.
  *G06F 3/0484* (2013.01)
  *G06F 3/0483* (2013.01)
  *G06F 3/0354* (2013.01)

(52) U.S. Cl.
  CPC ...... *G06F 3/04845* (2013.01); *G06F 3/03545* (2013.01); *G06F 3/0483* (2013.01)

(58) Field of Classification Search
  CPC . G06F 3/04845; G06F 3/03545; G06F 3/0483
  See application file for complete search history.

(56) References Cited

U.S. PATENT DOCUMENTS

| | | | |
|---|---|---|---|
| 8,352,876 B2* | 1/2013 | Batarseh | G06F 3/0483 345/901 |
| 9,606,622 B1* | 3/2017 | Brothers | G06F 3/013 |
| 9,665,258 B2* | 5/2017 | Tse | G06F 3/04845 |
| 10,237,622 B2* | 3/2019 | Yan | H04N 21/4438 |
| 2001/0024195 A1* | 9/2001 | Hayakawa | G06F 3/04847 345/173 |
| 2003/0020687 A1* | 1/2003 | Sowden | G06F 3/03547 345/157 |
| 2005/0144565 A1* | 6/2005 | Hemmings | G06F 17/212 715/776 |
| 2008/0259057 A1* | 10/2008 | Brons | G06F 1/1626 345/184 |
| 2009/0237367 A1* | 9/2009 | Ryu | G06F 3/0483 345/173 |

(Continued)

*Primary Examiner* — Andrea N Long
(74) *Attorney, Agent, or Firm* — Chamberlain, Hrdlicka, White, Williams & Aughtry

(57) ABSTRACT

An apparatus having an interactive display configured to display a first navigation user interface (UI) element in a first predetermined area of the interactive display, the first navigation UI element being an indicator for navigating forward one or more pages of the e-presentation, and memory configured to store an e-presentation including a plurality of pages, is disclosed. The apparatus displays a current page of the e-presentation, detects a first input from a user, makes a first determination that the first input initiated in the first predetermined area, in response to the first determination, display a second UI element on the interactive display, wherein the second UI element indicates a page immediately after the current page of the e-presentation, and make a second determination as to whether the first input exceeds a predetermined navigation threshold. When the first input exceeds the predetermined navigation threshold, the second UI element is updated.

16 Claims, 18 Drawing Sheets

(56) References Cited

U.S. PATENT DOCUMENTS

| | | | |
|---|---|---|---|
| 2012/0084704 A1* | 4/2012 | Lee | G06F 3/017 |
| | | | 715/776 |
| 2012/0149001 A1* | 6/2012 | Dohring | G09B 7/06 |
| | | | 434/365 |
| 2012/0240036 A1* | 9/2012 | Howard | G06F 17/217 |
| | | | 715/251 |
| 2013/0080881 A1* | 3/2013 | Goodspeed | G06F 17/21 |
| | | | 715/251 |
| 2013/0268847 A1* | 10/2013 | Kim | G06F 3/0488 |
| | | | 715/251 |
| 2014/0362016 A1* | 12/2014 | Matsuki | G06F 3/041 |
| | | | 345/173 |

* cited by examiner

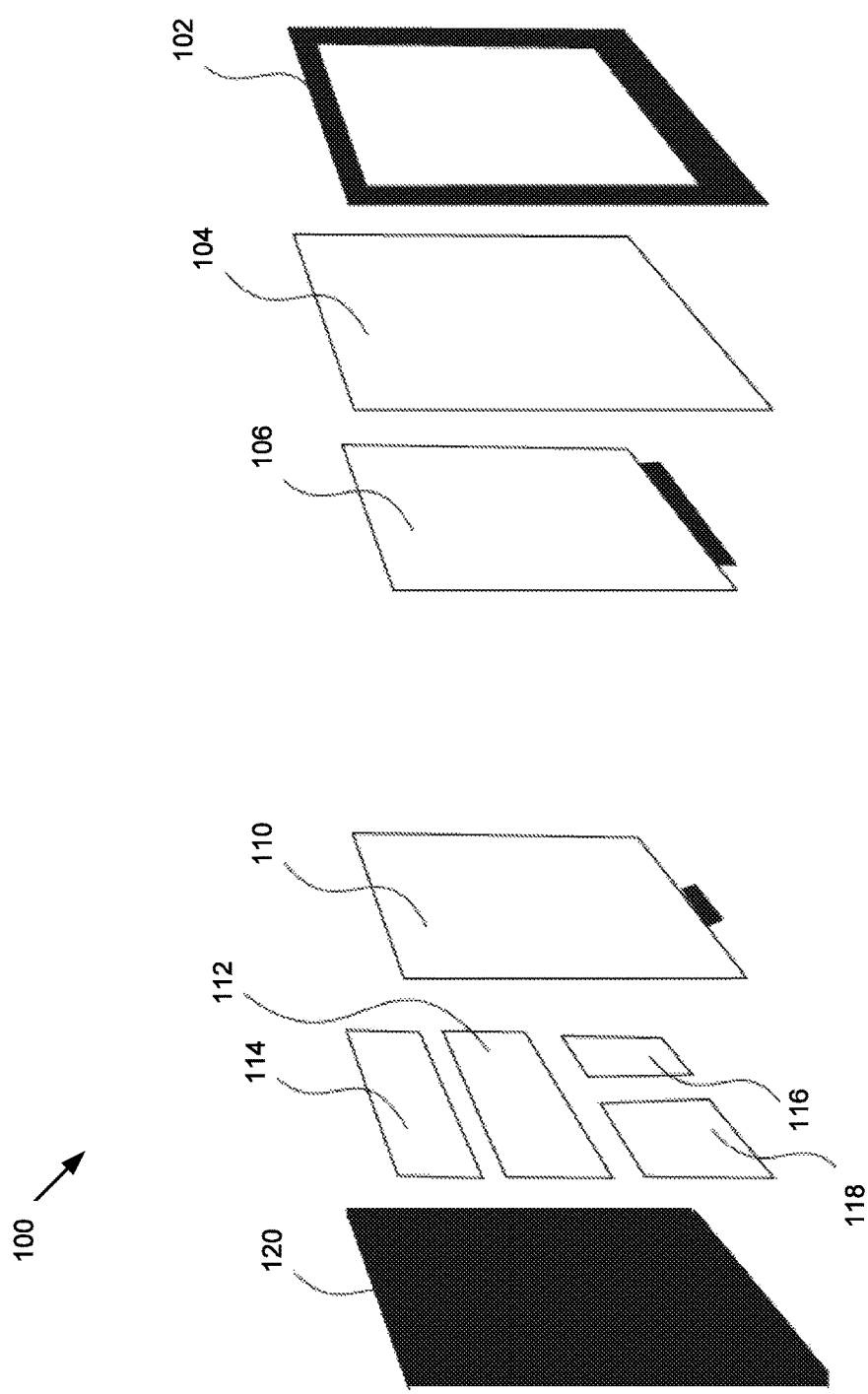

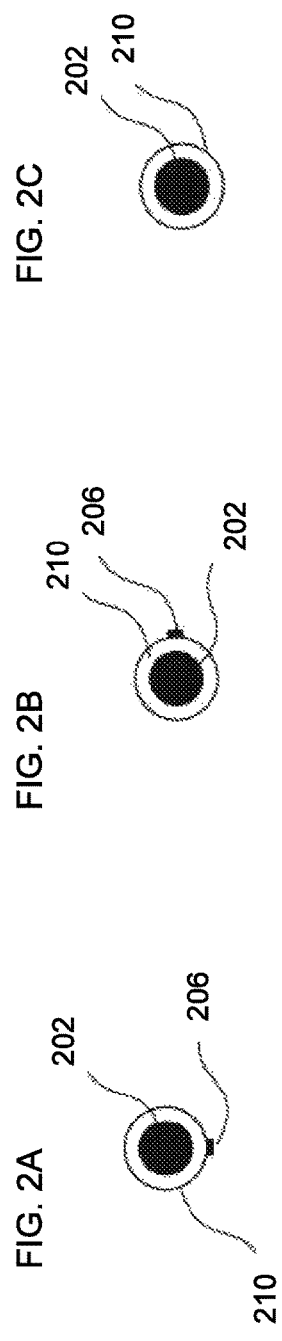
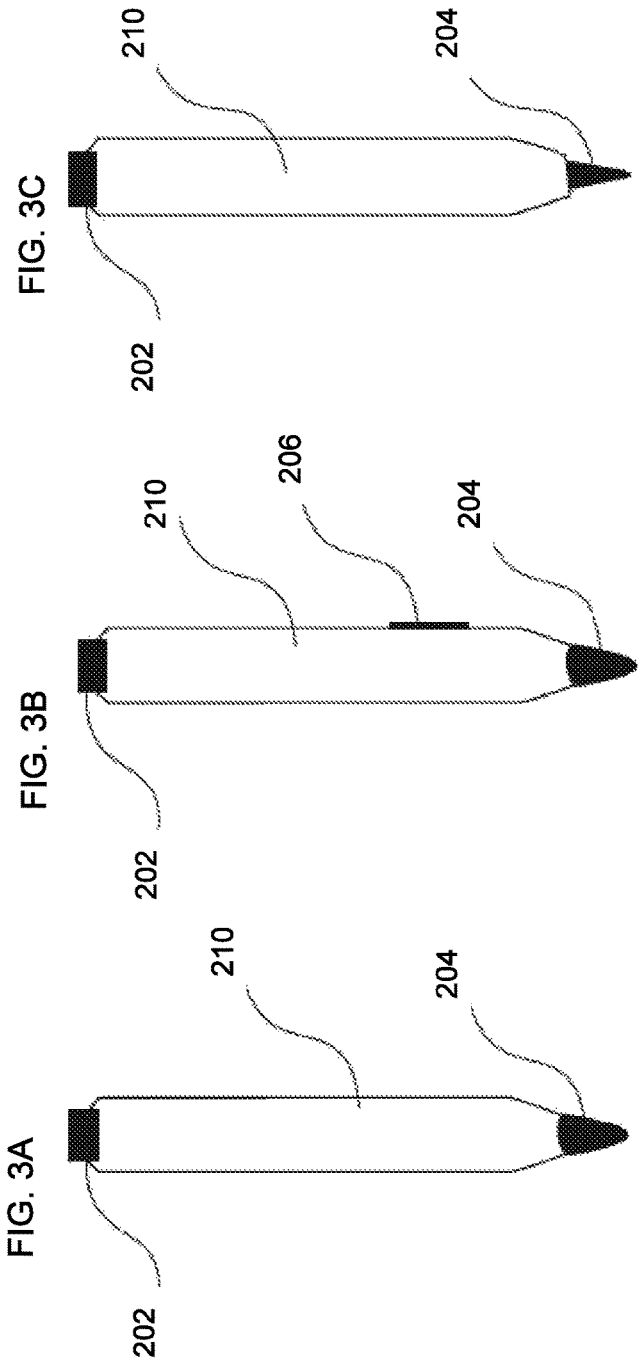

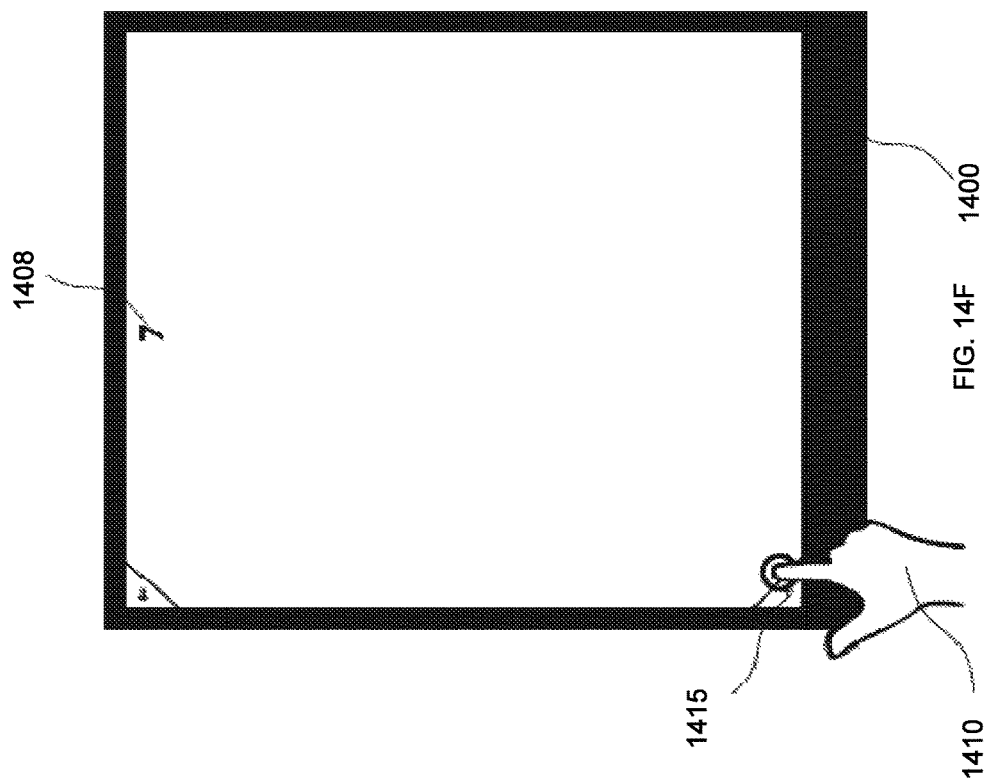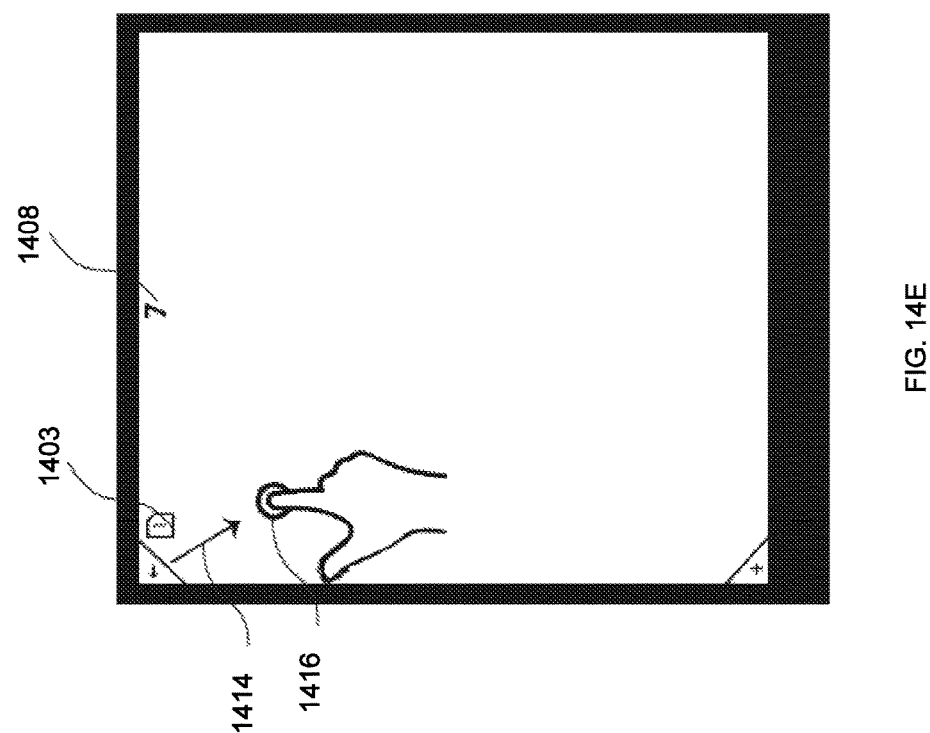

US 10,430,053 B1

EDGE NAVIGATION MECHANISM THAT MIMICS THE USE OF A FLIPCHART

CROSS-REFERENCE TO RELATED APPLICATIONS

This application claims priority under 35 U.S.C. § 119(e) to U.S. Provisional Patent Application Ser. No. 62/275,089, filed on Jan. 5, 2016, which is incorporated herein by reference in its entirety.

BACKGROUND

Flipcharts have not changed significantly for over 100 years. To this day, it is very common for any meeting room to have some form of a flipchart for writing notes or sharing ideas. Use of the flipchart has been augmented by blackboards and/or whiteboards for presenting information. These tools continue to thrive in the office environment despite the introduction of digital projectors, interactive displays, laptops, and mobile phone technology. Whiteboards and flipcharts are advantageous because they are transparent to users, they are easy to set up and use, and have no technological barriers. Although technology has now advanced in the office environment, whiteboards and flipcharts are fundamentally unchanged.

SUMMARY

In general, in one aspect, the invention relates to an apparatus, comprising an interactive display configured to display a first navigation user interface (UI) element in a first predetermined area of the interactive display, wherein the first navigation UI element is an indicator for navigating forward one or more pages of the e-presentation, and a memory configured to store an e-presentation comprising a plurality of pages, wherein the apparatus is configured to display a current page of the plurality of pages of the e-presentation, detect a first input from a user, make a first determination that the first input initiated in the first predetermined area of the interactive display, in response to the first determination, display a second UI element on the interactive display, wherein the second UI element indicates a page immediately after the current page of the e-presentation, make a second determination as to whether the first input exceeds a predetermined navigation threshold, and when the first input exceeds the predetermined navigation threshold, updating the second UI element.

In general, in one aspect, the invention relates to a non-transitory computer readable medium comprising instructions, which when executed by a processor perform a method for navigating pages on an apparatus configured to store an e-presentation, the method comprising displaying, on an interactive display of the apparatus, a current page of a plurality of pages of the e-presentation, and a first navigation user interface (UI) element in a first predetermined area of the interactive display, wherein the first navigation UI element is an indicator for navigating forward one or more pages of the e-presentation, detecting a first input from a user, making a first determination that the first input initiated in the first predetermined area of the interactive display, in response to the first determination, displaying a second UI element on the interactive display, wherein the second UI element indicates a page immediately after the current page of the e-presentation, and make a second determination as to whether the first input exceeds a predetermined navigation threshold, when the first input exceeds the predetermined navigation threshold, updating the second UI element.

BRIEF DESCRIPTION OF DRAWINGS

FIG. 1 shows an apparatus in accordance with one or more embodiments of the invention.

FIGS. 2A-2C show hardware for operating an electronic flipchart in accordance with one or more embodiments of the invention.

FIGS. 3A-3C show hardware for operating an electronic flipchart in accordance with one or more embodiments of the invention.

FIGS. 14A-14H show examples of navigating pages of an interactive device in accordance with one or more embodiments of the invention.

DETAILED DESCRIPTION

Figure 4:
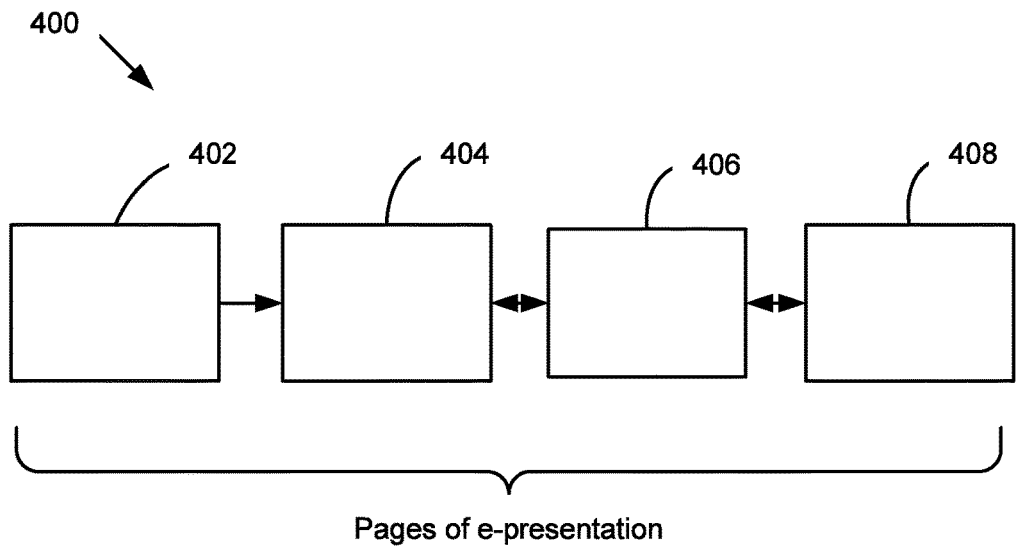
FIG. 4 shows a data structure for an electronic flipchart in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In order to achieve the user experience of navigating a flipchart while using an interactive device, embodiments of the invention provide a user interface (UI) capable of mimicking the navigating tasks a user's hands may perform when flipping through the pages of a conventional paper flipchart.

FIG. 1 shows a schematic diagram of an apparatus of an e-flipchart (also referred to as an e-flipchart apparatus) in accordance with one or more embodiments of the invention. While FIG. 1 shows a configuration of components, other configurations may be used without departing from the scope of the invention. For example, various components may be combined to create a single component. As another example, the functionality performed by a single component may be performed by two or more components.

Turning to FIG. 1, in accordance with one or more embodiments of the invention, the apparatus (100) may include one or more hardware elements, each having specific functionality. The main structure of the e-flipchart apparatus is formed between a back panel (120) and a front frame (102). In one or more embodiments of the invention, the front frame is a clear, opaque, or translucent material and includes an active area on which content may be displayed. In one or more embodiments of the invention, the back panel (120) is a rigid mechanical support structure made of a solid material, for example, plastic or metal. In between the back panel (120) and the front frame (102) is a low-power, reflective display (106), henceforth called an interactive display. In one embodiment of the invention, the interactive display (106) may be viewed as an output device that, through reflection, harnesses ambient light in order to present content. For example, the interactive display (106) may host slow refresh rates, monochromatic coloring (e.g., black and white, or gray scale shading), and the presentation of low contrasting definition. However, on the other hand, the interactive display (106) may have one or more of the following features: (i) very low power consumption; (ii) the readability of content outdoors under sunlight; and (iii) the providing of strain relief on the eyes of a user. As such, in one embodiment of the invention, fundamental static digital media, such as monochromatic text and still images, may be delegated to an interactive display (106) for presentation. Examples of an interactive display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the interactive display (106) of the e-flipchart apparatus may be bi-stable. In one embodiment of the invention, the interactive display may correspond to the reflective displayed described in U.S. Pat. No. 5,930,026. The invention is not limited to the reflective display described in the above referenced patent.

Continuing with the discussion of FIG. 1, in front of the interactive display (106) is a layer having at least one touch portion which may be a transparent rigid or semi-rigid board (104), or a frame that uses edge sensors, such as Infra-red or optical sensing technology. In another embodiment, the layer having at least one touch portion (104) may be a capacitive film layer. In one or more embodiments, the layer having at least one touch portion (104) may only cover a portion of the reflective display, with the remaining surface area of the reflective display (106) being covered by non-touch sensitive material which may or may not be clear, opaque, translucent, transparent and/or non-transparent. In the back of the interactive display (106) is an optional electromagnetic layer, which may be an electromagnetic board (110). By combining the electromagnetic layer (110) and the layer having at least one touch portion (104), at least a dual system for touch input is obtained, thereby forming any interactive device (i.e., a device on which a user input may be received, and in response to the user input, the device may perform an action). In one or more embodiments, touch input may include a finger(s) and/or a touch by a digital marker or digitizer.

In one or more embodiments of the invention, the electromagnetic layer (110) is configured to generate an electromagnetic field capable of detecting a digital marker or digitizer (see e.g., FIGS. 2A-3C) when such a tool is used to provide an input to the e-flipchart. The electromagnetic layer (110) includes wires (not shown) that allows the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) is configured to respond to each detected input type (see e.g., FIG. 6). For example, detecting a digital marker input may result in a line being drawn on the interactive display, while touching the same area with a finger may pan or zoom the display area.

Continuing with FIG. 1, controller (114) includes hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof. Volatile memory may include RAM, DRAM, or any combination thereof. In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality.

The controller (including components therein) (114) is powered by a battery and/or a power supply (112). In one or more embodiments, controller (114) is configured to detect and process input signals. For example, when an object touches the layer having at least one touch portion (104), a signal is sent to the controller (114) for detection of the input type and processing of the input. Further, the controller is configured to store e.g., in persistent storage and/or volatile memory, each stroke (in the form of touch input or digital marker) after such an action is performed on the e-flipchart (100) (see e.g., FIG. 6). In other words, the controller (114) is configured to store each stroke or action as it is produced in the active area of the front frame (102) of the e-flipchart apparatus (100). In one or more embodiments of the invention, the controller (114) includes functionality to implement the methods shown and described in FIGS. 6-8. Further, while the controller (114) has been described as a combination of hardware and software, the controller may be implemented entirely within hardware without departing from the scope of the invention.

In one embodiment of the invention, the e-flipchart may include one or more external communication interfaces (116). The communication interfaces permit the e-flipchart to interface with external components. The communication interfaces may implement any communication protocol, for example, Bluetooth, IEEE 802.11, USB, etc. The invention is not limited to the aforementioned communication protocols.

In one or more embodiments of the invention, the apparatus (100) of FIG. 1 is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus is configured to change from the low power state to an active state and perform the methods described in FIGS. 6 and 8.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes are minimized, scan rate of finger and pen inputs are delayed and overall power consumption of the components in the e-flipchart apparatus are reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input is performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the interactive display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the interactive display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1, the e-flipchart apparatus may include a camera for detecting certain types of input, e.g., a gesture interpretation.

In one or more embodiments of the invention, the e-flipchart is configured to enable a user to create, modify, store, and share an e-presentation. An e-presentation is described below in FIG. 4.

In one or more embodiments of the invention, the apparatus (100) of FIG. 1 is approximately 42 inches in diagonal with a 3:4 aspect ratio. Those skilled in the art will appreciate that the size of the e-flipchart apparatus is designed to mimic that of a typical paper flipchart; however, the dimensions and size of the interactive display apparatus of FIG. 1 may vary without departing from the scope of the invention. For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1 describes an e-flipchart with a series of components organized in particular manner, those skilled in the art will appreciate that the location of such various components in the e-flipchart, in particular, the interactive display (106), the layer having at least one touch portion (104), and the optional electromagnetic layer (110) may be arranged in different order without departing from the invention.

FIGS. 2A-2C shows the hardware for the digital marker or digitizer that may be used as one type of input capable of being detected by the e-flipchart apparatus described in FIG. 1 above. Specifically, FIGS. 2A-2C show a top view of the digital marker in the form of a cylinder (210). The top of the digital marker has an electronic eraser (202) and at least one button (206). In one or more embodiments of the invention, the button (206) is software programmable and, when pressed or otherwise activated, is configured to send one or more signals to the e-flipchart. For example, when the button (206) is pressed or otherwise activated, the button (206) may send a wireless signal that is detected by the e-flipchart. Those skilled in the art will appreciate that the button (206) may be hidden or built into the electronic eraser (202). Further, although only one button is shown in FIG. 2A-2C, the digital marker may include more than one button, where each button is separately programmable. In one or more embodiments, when the electronic eraser (202) comes into contact with the e-flipchart, the e-flipchart is configured to remove or otherwise clear content from the corresponding locations on the interactive display. Said another way, the electronic eraser (202) mimics the operation of a traditional eraser.

FIG. 2B shows a different orientation (i.e., a side view with a zero degree rotation of the cylinder) of the digital marker or digitizer, in which the button (206) is located at the side of the electronic eraser (202) rather than at the bottom of the electronic eraser (202). FIG. 2C shows another top view of the digital marker, in which the cylinder is rotated 90 degrees. In FIG. 2C, the button (not shown) is hidden from view.

FIGS. 3A-3C depict side views of the digital marker or digitizer in accordance with one or more embodiments of the invention. In FIGS. 3A-3C, the entire length of the cylinder (210) form of the digital marker can be seen. In FIG. 3A, on a top end of the digital marker, the electronic eraser (202) is shown. In addition, the tip (204) of the digital marker or digitizer is shown on a bottom end of the cylinder (210). The tip (204) material may be selected such that the tip (204) slides easily over the writing surface. Materials for the tip (204) may include, but are not limited to, high density polyoxyethylene, hard felt, elastomer, polyoxymethylene, polyacetal, or polyoxyethylene. Other materials may be used without departing from the invention.

In one or more embodiments of the invention, the tip (204) of the digital marker may be used to draw or write directly on the active area of the front frame (102) of the e-flipchart apparatus. In FIG. 3B, the button (206) is shown on a side of the cylinder (210) of the digital marker. In FIG. 3C, the tip (204) of the digital marker is shown as being thinner and sharper in comparison with the tip of FIGS. 3A-3B. Those of ordinary skill in the art will appreciate that the tip (204) of the digital marker is a hardware component that may be interchangeable and designed to mimic a pencil, pen, marker, stylus, or any other suitable writing tool having varying widths and sharpness. In FIG. 3C, the button is not shown.

While FIG. 3A-3C show a cylinder shape for the digital marker, those skilled in the art will appreciate that the shape of the digital markers may take other forms without departing from the scope of the invention.

As described above, users of the e-flipchart are able to create, display, store, modify, and share e-presentations. Each e-presentation includes one or more pages organized in a sequential manner. The controller includes functionality to store the information necessary to maintain the e-presentation and allow the user to interact with the e-presentation as described below. An exemplary e-presentation is shown in FIG. 4.

FIG. 4 shows an e-presentation (400) in accordance with one or more embodiments of the invention. The e-presentation may include one or more pages (402, 404, 406 408), where each page represents an electronic page of the e-flipchart. Each page of the e-presentation (400) corresponds to content that may be displayed on the e-flipchart apparatus. In one or more embodiments of the invention, the e-presentation (400) shown in FIG. 4 may be stored in memory or persistent storage associated with the e-flipchart apparatus or in a cloud computing environment to which the e-presentation is backed-up, or any combination thereof. For example, the e-presentation may be stored in persistent storage locally, and mirrored in the cloud environment.

In one or more embodiments of the invention, the e-pages (402, 404, 406, 408) are linked as the e-presentation is populated, in real-time. The link between the pages is represented by the bi-directional arrows shown in FIG. 4. Specifically, the link between pages of the e-presentation and the metadata stored to track the various information associated with the e-presentation is shown in FIG. 5.

Figure 5:
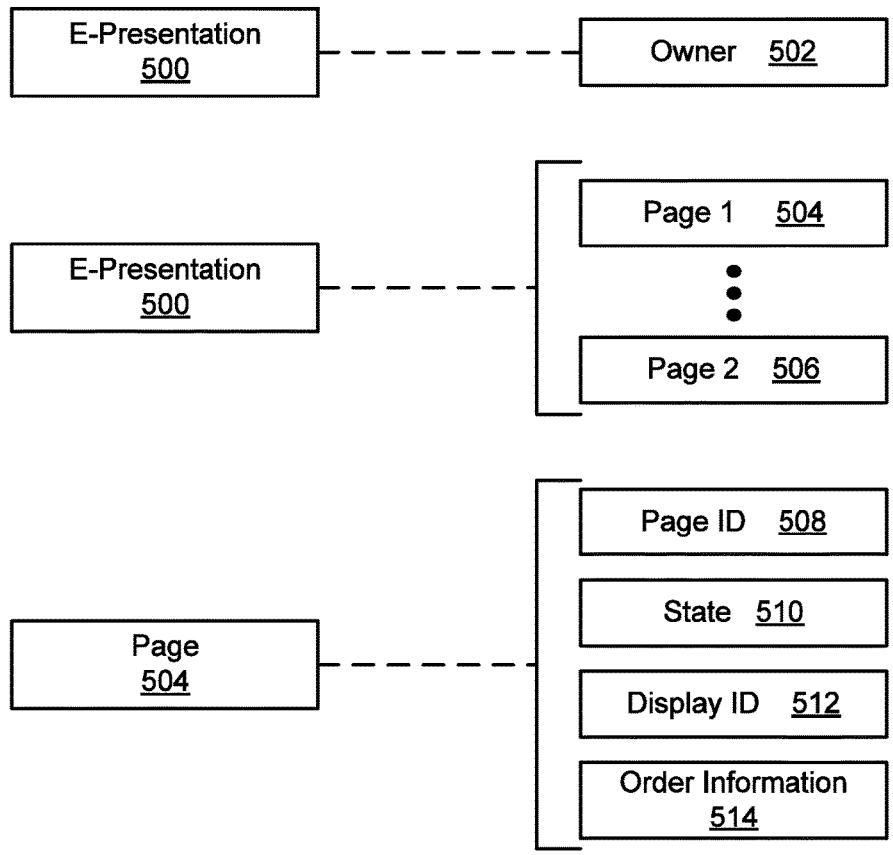
FIG. 5 shows data relationships for an electronic flipchart in accordance with one or more embodiments of the invention.

Specifically, in FIG. 5, each e-presentation (500) may be associated with an optional owner (502). In one or more embodiments of the invention, the owner (502) may be the entity or device on which the e-presentation is initially created. In this case, the owner (502) may be represented by a device ID which identifies the device on which the e-presentation is created. For example, when the e-presentation (500) is created on the e-flipchart apparatus, the owner (502) field may be populated with the local ID of the e-flipchart. Alternatively, the owner (502) may be an individual or group of individuals. In this case, the owner (502) may be represented by one or more user IDs. In one or more embodiments, although not shown, an e-presentation may also have permissions associated with the presentation as a whole, or each page of the e-presentation. Specifically, permissions to read/view/edit an e-presentation may be given by the owner (502) of the e-presentation (500), or by a user of the e-flipchart or other device that is specified as the owner of the e-presentation.

In addition, as shown in FIG. 4 above, the e-presentation (500) may be composed of one or more pages (e.g., Page 1 (504), Page N (506)). Each page (504, 506) is in turn associated with content (data) and metadata. For example, as shown in FIG. 5, in one or more embodiments of the invention, page (504) has a page ID (508), a state (510), a display ID (512), and order information (514). The page ID (508) uniquely identifies that page in the e-presentation. The page ID (508) may be numerical, alphabetical, symbolic, or any combination thereof. In one embodiment of the invention, each page may be associated with a state (510). In such embodiments, the state (510) of the page (504) may be, but is not limited to, an active or an inactive state. An active state indicates that page (504) is currently displayed or being written to via the e-flipchart or via another device (see e.g., FIG. 10). An inactive state indicates that page (504) is part of the e-presentation but is not the page that is currently displayed (i.e., the page is not shown) or being written to. Those skilled in the art will appreciate that a page may be associated with other states without departing from the scope of the invention, such as for example, an edit state in which the page is being edited offline, or an offline state in which the page is linked to the e-presentation but is offline or stored in persistent memory. In a different embodiment of the invention, page (504) is related to the viewport information of the next page. In yet another different embodiment of the invention, page (504) has a page ID without a state and a display ID.

In one embodiment of the invention, each page may be associated with a display ID (512). In such embodiments, the display ID (512) associates the page (504) with a display device. For example, in a scenario in which the page (504) is displayed on the e-flipchart, the display ID may be the ID of the e-flipchart. In an alternate embodiment, suppose page (504) is linked to an e-presentation currently being modified on the e-flipchart, but is not the active page of the e-presentation. In this case, the page (504) may be shared with second device over a network, so that the owner of the second device may edit the page (504) (see e.g., FIGS. 9A-9C, 10). In this scenario, the display ID (512) associated with the page (504) is the ID of the second device on which the page (504) is being edited. Accordingly, the display ID (512) of a page (504) linked to an e-presentation may change at any time. In one or more embodiments, there may be multiple display IDs (512), each one corresponding to a device that is currently viewing the page (504). Further, in one or more embodiments, the display ID may only be assigned when the state of a page is active. When the state of page is inactive, the display ID field in the data structure of the e-presentation may be null.

In one or more embodiments of the invention, the order information (514) of a page (504) links the page (504) to other pages in the e-presentation in a specific order and indicates how the pages of an e-presentation may be traversed. Specifically, the e-flipchart apparatus mimics use of a typical paper flipchart apparatus, in which a new page is obtained by flipping a current page over the flipchart apparatus. In the typical flipchart apparatus, the pages are flipped in an order, such that pages cannot be skipped to obtain a particular page of the e-presentation. Similarly, with the e-flipchart apparatus, each page (504) of the e-presentation may be linked to at least one page prior to the page (504) and at least one page following the page (504) in the e-presentation. In one or more embodiments of the invention, the order information (514) may include the page IDs of at least the page prior to the page (504) and the page following the page (504). Those skilled in the art will appreciate that the controller may facilitate skipping to a page out of order without departing from the scope of the invention.

In one or more embodiments of the invention, the metadata associated with an e-presentation, as shown in FIG. 5, may be populated and stored into a data structure as the e-presentation is created and modified. The data structure may then be stored locally in the e-flipchart apparatus persistent storage, or in a cloud computing environment. A specific example of how the data structure is populated is described in FIG. 8 below.

Figure 6:
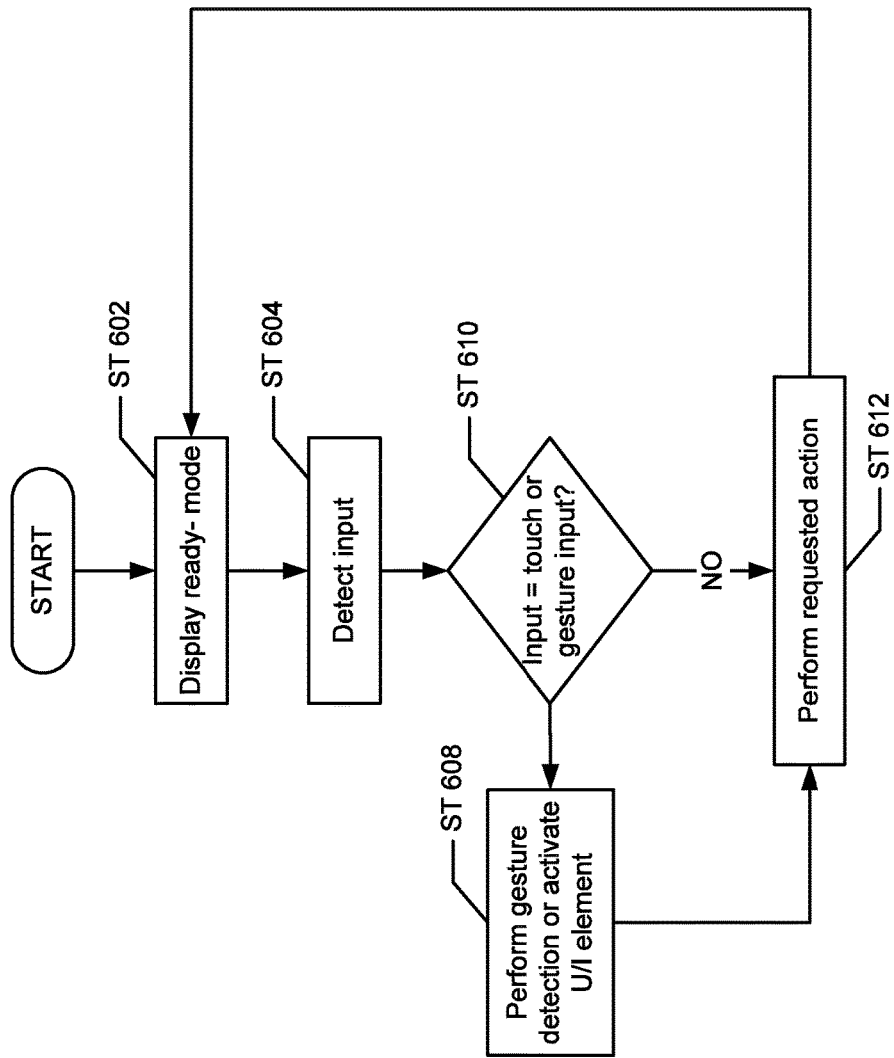
FIG. 6 shows a flowchart in accordance with one or more embodiments of the invention.

FIG. 6 shows a flow chart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 602, the e-flipchart apparatus is in display ready-mode. As described above, the e-flipchart apparatus may be always "on," and therefore, ready for use when a user walks up to the apparatus or provides another type of input that is detected by the apparatus (Step 604). Specifically, in the ready-mode (or base state), the e-flipchart apparatus polls for an input at a low frequency or input scan rate. In this mode, the display area of the e-flipchart apparatus may include the image from the last time it was fully active. When an input is detected, the apparatus changes state from ready-mode to the active state. For example, in one or more embodiments of the invention, when input is sensed by the electromagnetic board, a signal is sent to a controller CPU which is running the energy management software to "wake up" some or all the components and put them in "active mode". The same process occurs when a signal is detected via a GUI, touch input, or in a "wake up on LAN" input.

The input detected by the e-flipchart apparatus in Step 604 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the e-flipchart apparatus. Thus, upon detection of an input, a determination is made as to whether the input is a touch input or a gesture input (Step 606). If the detected input is a user gesture, the e-flipchart apparatus may be configured to perform gesture detection or activate a user interface (UI) component (Step 608). For all other input types, an appropriate action is performed by the e-flipchart apparatus (Step 610). For example, when the detected input is not a touch or gesture input, but rather, is a wireless signal, for example, a press of the button on the digital marker, corresponding external events may be activated (Step 610). For example, in Step 610, when the input is a Bluetooth signal, the e-flipchart apparatus may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the e-flipchart apparatus. For example, proximity sensors may include ultrasonic sensors or infrared sensors. In yet another embodiment of the invention, when the detected input is a pen stroke using a digital marker or digitizer, the e-flipchart apparatus may be configured to detect the path of the digital marker tip and convert the motion to a display of simulated ink strokes (Step 612). Accordingly, the specific action performed by the e-flipchart may vary depending on the type of input received.

When the detection input is a gesture or a touch input, the activated components may display data on the display area, flip a page, zoom into the content displayed, or perform any other suitable action in response to the touch/gesture input. In one or more embodiments of the invention, after performing the action in response to the detection of an input, the e-flipchart apparatus returns to the base state of "ready-mode." In one or more embodiments, in this mode the e-flipchart apparatus to continue to display an image without any power used by the bi-stable interactive display component of the apparatus. Examples of the types of actions that may be performed are described below in FIGS. 7A-7E.

Figure 7C:
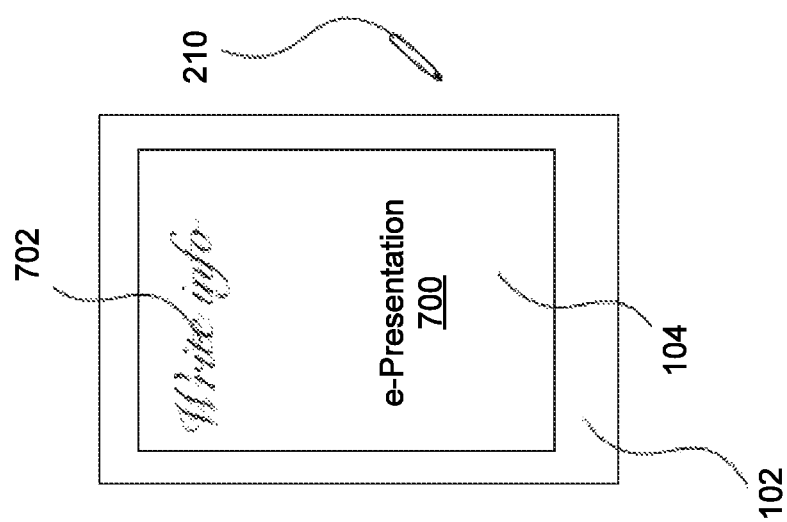
FIGS. 7A-7F show examples of an electronic flipchart in accordance with one or more embodiments of the invention.
Figure 7B:
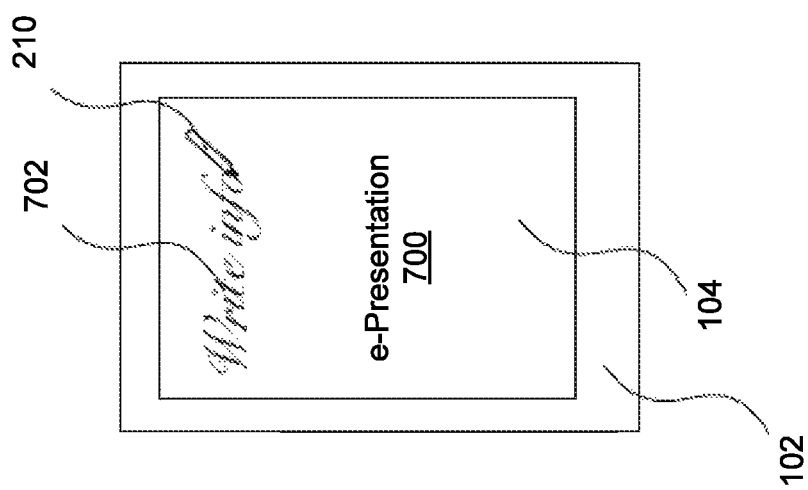
Figure 7A:
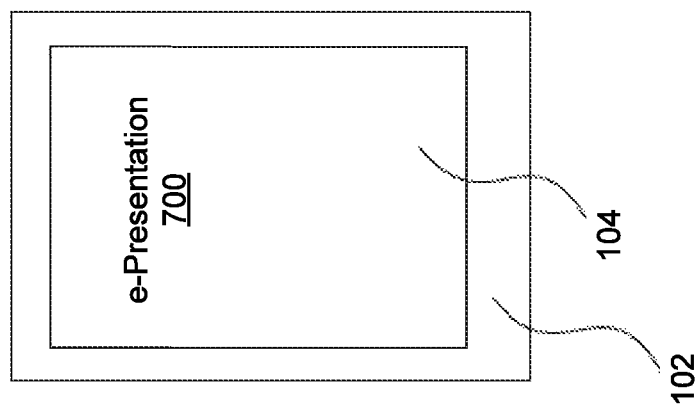

Specifically, in one or more embodiments of the invention, FIG. 7A shows an example front frame (102) of an e-flipchart apparatus. The front frame (102) mimics a screen and has an area which is capable of accepting at least two type of input: touch and digital marker. When one of the aforementioned types of input is detected, for example in the active region or display area of the layer having at least one touch portion (104), an e-presentation (700) is created and displayed. Specifically, when a user walks up to the e-flipchart apparatus in ready-mode and provides an input, the e-presentation (700) is created. Creation of the e-presentation may include generating and populating the data and metadata shown in FIG. 5. In FIG. 7A, the display area is blank. In FIG. 7B, an example input of writing (702) using a digital marker (210) on the active area of the e-flipchart apparatus is shown. Specifically, in FIG. 7B, when the tip of the digital marker or digitizer (210) is pressed onto the active area of the e-flipchart apparatus, the path of the digital marker (210) is detected and converted by the software of the e-flipchart apparatus into simulated ink strokes (702) which are displayed on a first page of the e-presentation (700). FIG. 7C shows at least one embodiment in which the displayed stroke images are maintained on the e-flipchart apparatus without any power consumption by the interactive display component of the e-flipchart apparatus. In one or more embodiments of the invention, the interactive display displays the latest information that resulted from input to the e-flipchart, and does not change until new input is received by the controller.

Figure 7E:
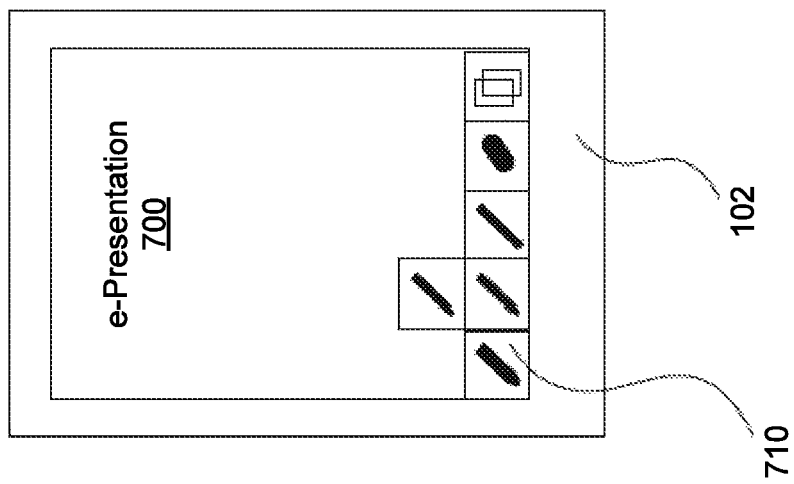
Figure 7D:
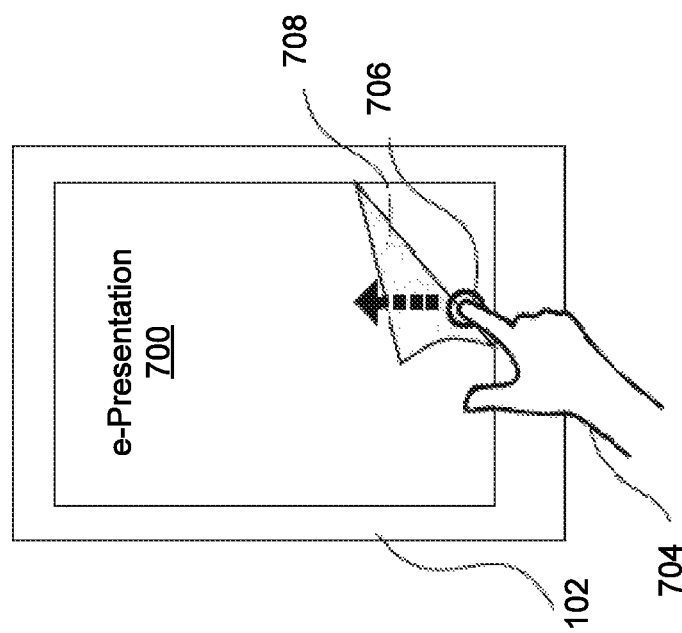

In FIG. 7D, a touch input (704) is detected by the e-flipchart apparatus. In the example shown, a user touches the display screen (706) and, in one or more embodiments, moves his/her finger in an upward motion (indicated by the arrow pointed upward), resulting in the current page (708) flipping over to begin a new page of the e-presentation (700). Those skilled in the art will appreciate that a page may be flipped using a gesture input as well, in addition to or instead of a touch display as shown in the example of FIG. 7D. For example, a visual gesture (e.g., movement of a hand in a particular path without touching the e-flipchart) which may be detected by the camera and that is interpreted as a page flip may result in the software interpreting the flip gesture as a page flip action. A page flip action results in transitioning from a current page to another page of the e-presentation. In FIG. 7E, a graphical user interface (GUI) (710) is displayed on the screen of the e-flipchart apparatus. The GUI (710) may be invoked by the pressing of a button on the digital marker, by a gesture, or by any other designated input. In one or more embodiments of the invention, the GUI (710) may be invoked from a menu on a secondary screen that is, for example, connected to a cloud server by a bi-directional communication channel. In one or more embodiments, the GUI (710) may be used to select particular features or perform selected actions such as, for example, sharing the current page of an e-presentation, selecting an eraser, changing the font, style, or color of the displayed line strokes, etc.

Figure 7F:
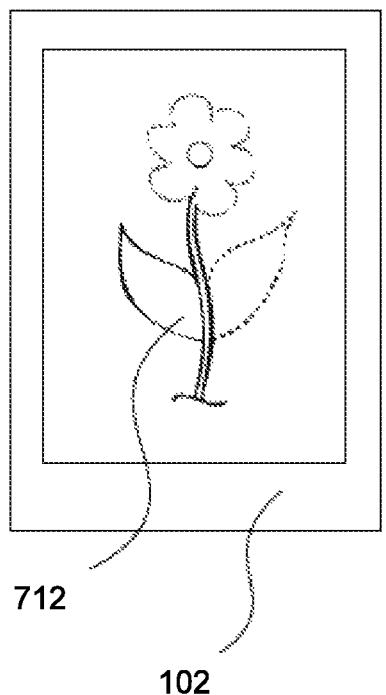

FIG. 7F shows an example of an e-presentation having a drawing. In one or more embodiments of the invention, as shown in FIG. 7F, the e-flipchart apparatus may display a pencil skeleton image (712) to aid a user in creating an e-presentation. The pencil skeleton may provide a light image so that a user may, at a later time, trace the light pencil drawing with a marker to draw a predetermined object. This feature may be used, for example, to create an illusion that the user is creating artwork on the fly. Although FIG. 7F shows a pencil skeleton of a flower, those of ordinary skill would appreciate that the pencil skeleton may depict any object, or may more generally provide any type of aid for writing or drawing. For example, the pencil skeleton may be a combination of light horizontal and vertical lines mimicking graph paper or notebook paper.

Figure 8:
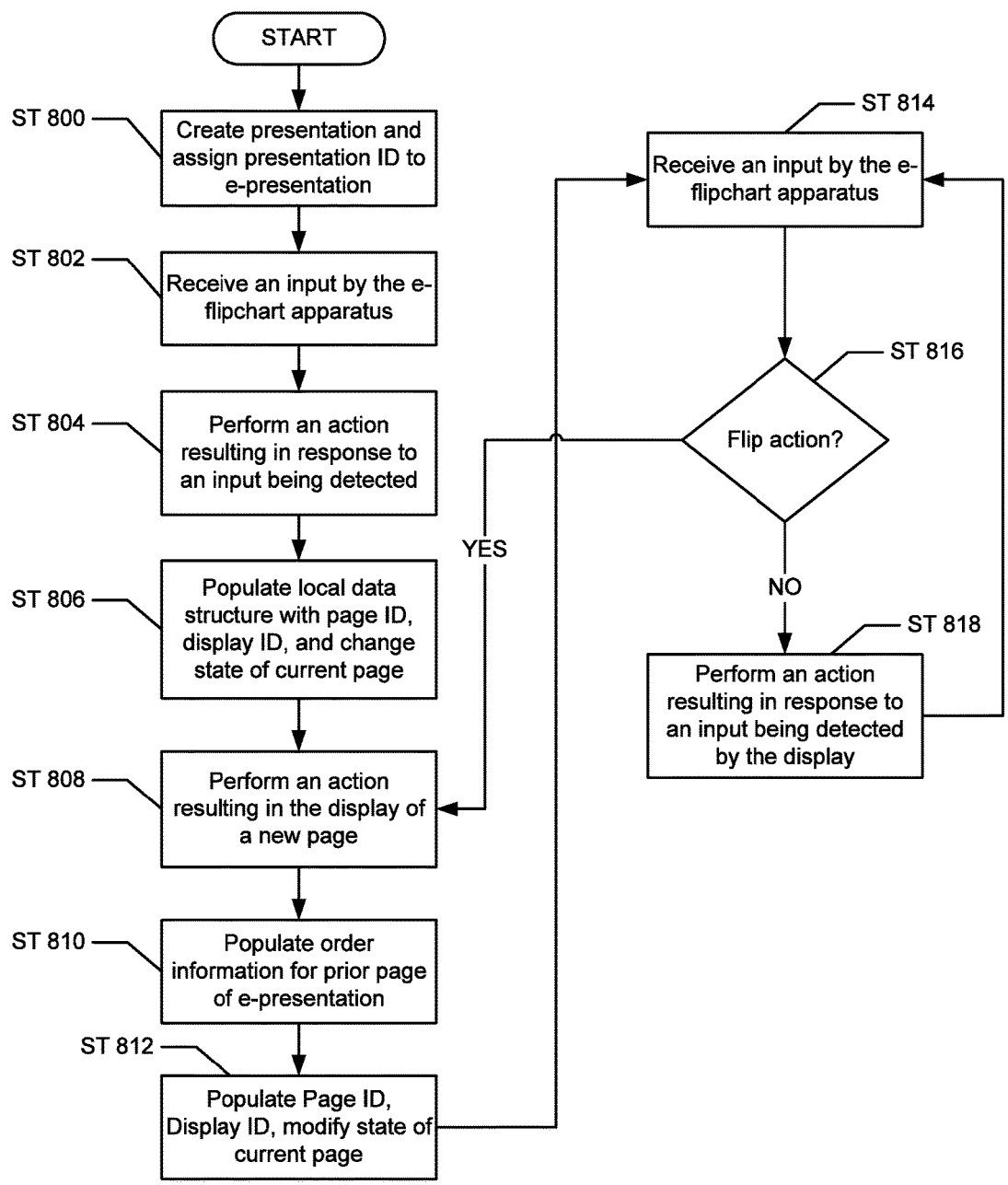
FIG. 8 shows a flowchart in accordance with one or more embodiments of the invention.

FIG. 8 shows a flow chart in accordance with one or more embodiments of the invention. Specifically, FIG. 8 shows a flowchart for creating and maintaining an e-presentation in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In step 800, an e-presentation is created and associated with a presentation ID. In one or more embodiments of the invention, the presentation ID may be assigned by an e-presentation server, or alternatively, may be generated by the e-flipchart or provided in response to an input prompt to the user. The e-presentation server may be a remote server that is connected to the e-flipchart apparatus via a network. The functionality and purpose of the e-presentation server is described below in FIG. 10. The presentation ID may be a numerical ID, alphabetical ID, a symbolic ID, or any combination thereof, and is configured to uniquely identify the e-presentation displayed on the e-flipchart apparatus. When an e-presentation is initially created, it may not contain any content. Further, if the e-flipchart apparatus does not receive any user input within a certain period of time, the e-flipchart apparatus may transition to ready-mode. In one embodiment of the invention, step 800 may be performed when the e-flipchart apparatus is in either ready mode or active mode.

In Step 802, an input is detected by the e-flipchart apparatus in ready-mode. In ready-mode, the apparatus is scanning for input at a low frequency, e.g., twice per second. As described above, the input detected by the interactive display may be a touch input, a digital marker input, a proximity sensor input (e.g., when a user approaches the e-flipchart apparatus), a network signal, or any other suitable type of input. As described above, when an input is detected, the apparatus changes state from ready-mode to the active state. For example, in one or more embodiments of the invention, when input is sensed by the electromagnetic board, a signal is sent to the controller CPU which is running the energy management software to "wake up" some or all the components and put them in "active mode". The same process occurs when a signal is detected via a GUI, touch input, or in a "wake up on LAN" input. Step 802 may also be performed when the e-flipchart apparatus is in active mode.

In step 804, an action is performed in response to the received input. For example, the corresponding action may be to activate one or more components of the e-flipchart apparatus, convert input strokes to display rendered stroke images, display a GUI, share information with another device, etc. In one or more embodiments of the invention, when the input is received via a digital marker on the surface of the apparatus, the apparatus may identify a tip width of the digital marker via various methods. For example, the electromagnetic board may detect the tip width of the digital marker. Alternatively, the layer having at least one touch portion may be configured to detect the tip width of the digital marker. In yet another embodiment, the digital marker may transmit a signal to the apparatus that includes information about the tip width. In one or more embodiments of the invention, using information about the tip width associated with the input received, the apparatus may be configured to display a certain line width for rendered strokes.

In Step 806, a data structure (shown in FIG. 5, for example) for storing metadata associated with the e-presentation is populated with a page ID and a display ID. In addition, the state of the current page with the page ID is changed to active. In one or more embodiments of the invention, the data structure may be populated and stored locally, in the memory associated with the e-flipchart apparatus, or may be stored remotely, for example, in an e-presentation server or cloud computing environment. If the data structure is stored locally, the data structure may be backed-up (e.g., mirrored) on a remote server or in the cloud computing environment. At this stage, various actions may be performed resulting in writing or drawing on the current page. In step 808 an input resulting in display of a new page may be detected. For example, a touch input or gesture which results in a page flip.

In step 810, when a second page is created as part of the e-presentation, the data structure is populated with order information, linking the first page to the new second page in the e-presentation. Optionally, in step 812, the new page of the e-presentation may be assigned its own page ID, following that of the first page ID, and display ID. In addition, the state of the first page is changed to inactive, and the state of the current page, i.e., the second page, is changed to active. In step 814, input is received by the e-flipchart apparatus.

In step 816, a determination is made as to whether the input received in Step 814 is a page flip action. If a page flip action is detected, the method proceeds to Step 808 and the data structure continues to populate itself with a third page ID and ordering information for the second page is updated to reflect the link to the third page. This process may repeat each time a page flip action is detected by the e-flipchart apparatus. Alternatively, if no page flip action is detected, then the process proceeds to step 818. In step 818, an action corresponding to the input received is performed. In one embodiment of the invention, the process may not end (i.e., various steps in FIG. 8 may be repeated), because the e-flipchart apparatus does not turn "off." Rather, when input is not detected for a predetermined amount of time, the e-flipchart apparatus returns to "ready-mode" and waits for an input (Step 814).

Figures 9A, 9B:
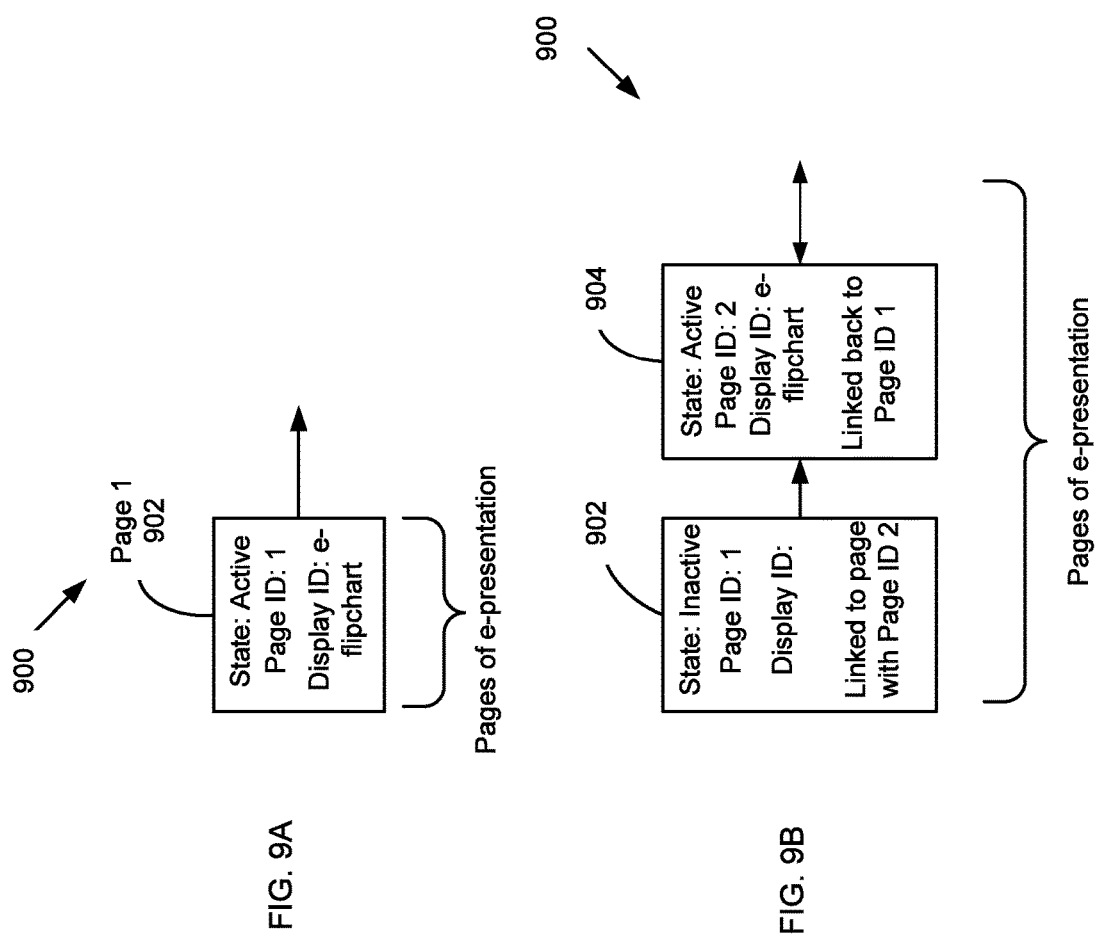
FIGS. 9A-9C show examples of storing data for an electronic flipchart in accordance with one or more embodiments of the invention.

FIGS. 9A-9E show examples of the method described in FIG. 8 above in accordance with one or more embodiments of the invention. In FIG. 9A, consider a scenario in which an e-presentation is created by the e-flipchart apparatus. At some point after the e-presentation is created, assume that a user walks up to the e-flipchart apparatus and provides an input in the form of pressing a button on or writing with a digital marker. Once the input is detected, the action associated with the input is interpreted and, in this example, result in content being associated with the first page (902) of the e-presentation. The first page (902) (i.e., the page on which characters are written, for example) is displayed on the active area of the e-flipchart apparatus with a white background. At this stage, the data structure (900) which stores metadata associated with the e-presentation begins to be populated with metadata. As shown in FIG. 9A, the metadata associated with page 1 (902) includes the state of active, a page ID of 1, and a display ID that identifies the e-flipchart apparatus. The owner ID of the e-presentation may also be the ID of the e-flipchart apparatus, or may be null for purposes of this example. Those skilled in the art will appreciate that no order information exists for a single page e-presentation.

Now suppose the user gestures or provides a touch input which the software of the e-flipchart apparatus interprets as a page flip action. As shown in FIG. 9B, a second page is added to the e-presentation, and the metadata for both page 1 (902) and page 2 (904) is updated/populated in the data structure (900). Specifically, the state of page 1 (902) becomes inactive as it is no longer the page that is displayed. Further, the display ID field of page 1 (902) is updated to null. Order information is added to page 1 (902) linking the page to the second page (904) in order. For page 2 (904), an active state is retained, a new page ID is assigned and the display ID is updated to be the ID of the e-flipchart apparatus. Order information for page 2 (904) is populated to reflect that page 2 (904) is linked to page 1 (902). More specifically, page 2 (904) comes after page 1 (904). The order information becomes important when a page flip action is performed. Specifically, during normal operation, because the e-flipchart apparatus mimics a traditional paper flipchart, pages must be flipped in order (i.e., when using the page flip action, one cannot jump from page 1 to page 4, for example, without also flipping pages 2 and 3, although pages may be flipped in groups).

Figure 9C:
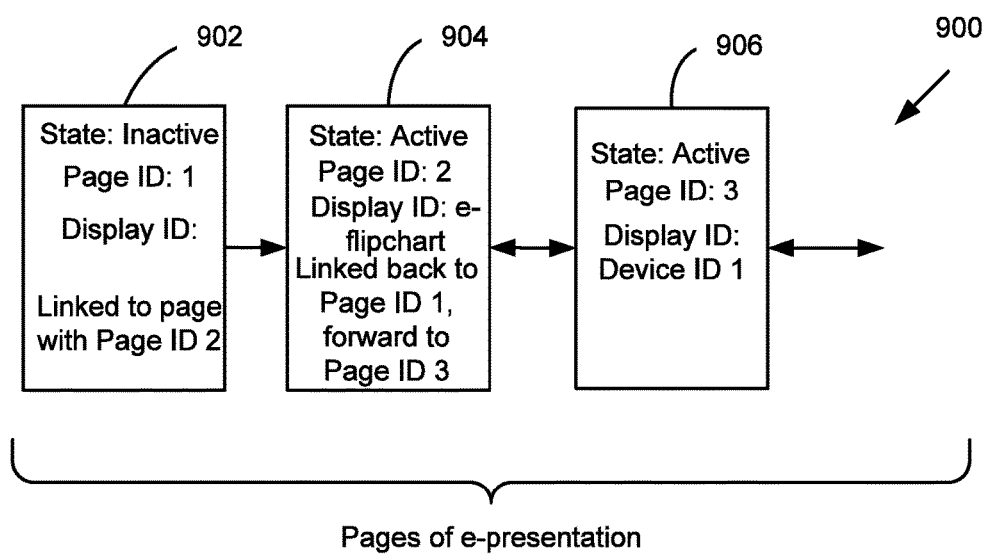

Continuation with the example, FIG. 9C depicts the metadata associated with an e-presentation that is shared with other owners/devices in order to collaborate on the e-presentation. In FIG. 9C, a third page (906) is added to the e-presentation. In this example, the third page is shared directly with another device (Device 1), while the second page (904) is still displayed on the active area of the e-flipchart apparatus. Device 1 (not shown) may be any smart phone, tablet, laptop, or desktop computer, a smart/interactive white board, or any other suitable device capable of displaying content and connecting to the e-flipchart apparatus or the shared e-presentation server (1002). Further, Device 1 may be connected to the e-flipchart apparatus via a point-to-point or a network connection that may be wired or wireless, such as via the Internet, or indirectly connected via a cloud server. Continuing with the data structure (900) content, the first page (902) remains inactive, and the second page (904) is updated to reflect that it is linked to page 1 (902) before and page 3 (906) after. In one or more embodiments of the invention, the state of the third page is also active, because even though it is not displayed on the e-flipchart apparatus, it is being displayed on another device (i.e., Device 1). Accordingly, the Display ID of the third page (906) is Device ID 1, which identifies Device 1.

Those skilled in the art will appreciate that page 3 (906) of the e-presentation as described in FIG. 9C above may be shared locally (i.e., in the same room with others viewing the e-presentation) or remotely (i.e., via a network connection to someone viewing the e-presentation on a remote device). Further, information may be sent and received by Device 1 and the e-flipchart apparatus bi-directionally, either through a server configured to store and manage the entire e-presentation file, or directly. Accordingly, a portion of or the entirety of e-presentations created on the e-flipchart apparatus may be shared and edited by a plurality of devices, all connected to the e-flipchart apparatus or to a shared e-presentation server. This allows for collaboration with audience members who are not physically located in the room where the e-flipchart is located.

Figure 10:
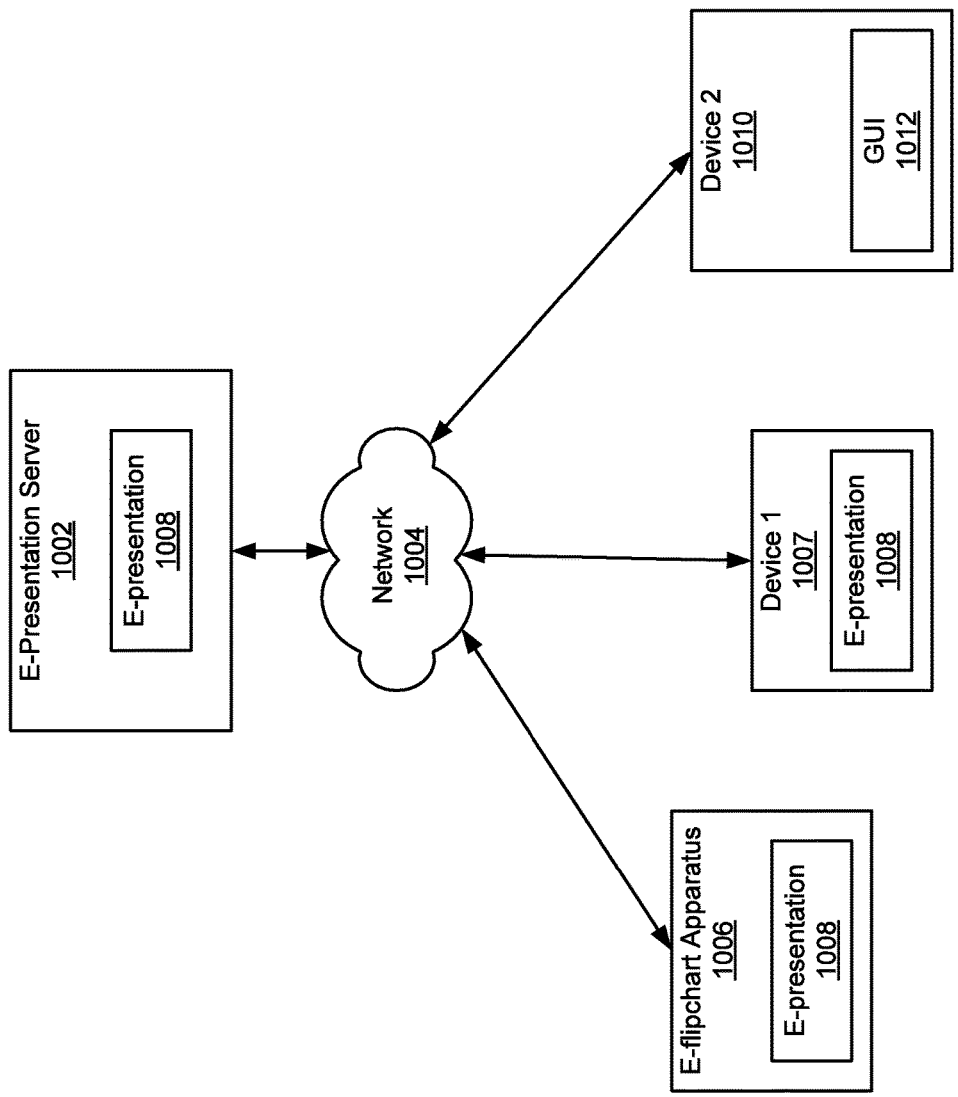
FIG. 10 shows a system for collaboration using an electronic flipchart in accordance with one or more embodiments of the invention.

FIG. 10 shows a system for sharing an e-presentation created on an e-flipchart apparatus in accordance with one or more embodiments of the invention. Specifically, FIG. 10 shows an e-presentation server (1002) connected via a network (1004) to the e-flipchart apparatus (1006) on which an e-presentation (1008) is created. In one or more embodiments of the invention, the e-presentation server (1002) may be a remote server configured to store and manage the e-presentation as a shared file. For example, the e-presentation server may be a cloud computing server or any other suitable type of server. In such cases, as shown in FIG. 10, the e-presentation server includes a copy of the e-presentation (1008). In one or more embodiments of the invention, the e-presentation server (1002) is configured to assign an e-presentation ID to an e-presentation when it is created or displayed on the e-flipchart apparatus display (1006). All the pages of an e-presentation are then associated with this e-presentation ID. In addition, the e-presentation server (1002) is configured to enforce the permissions of the e-presentation and may maintain and/or back-up the data structure (see e.g., FIG. 5) that is created for each e-presentation. The e-presentation server (1002) may also be configured to synchronize a shared e-presentation based on multiple contemporaneous inputs from other devices (e.g. 1007) connected to the same e-presentation.

In one embodiment of the invention, if multiple devices are concurrently editing an e-presentation, then when a specific device makes a change to the e-presentation, the device sends an incremental update to the e-presentation server (1002). In response to receiving the update, the e-presentation server updates its copy of the e-presentation and then sends the incremental update to all other devices (except the device that sent incremental update).

Continuing with the discussion of FIG. 10, the network (1004) may be any wired or wireless network configured to facilitate bi-directional communication between the e-presentation server (1002) and the e-flipchart apparatus and directly between device 1 (1007) and device 2 (1010). As described above, the network (1004) may be the Internet or any other suitable network. Device 1 (1007) and Device 2 (1010) may be local devices in the same room as the e-flipchart apparatus, or remote devices all connected to the e-flipchart apparatus via the e-presentation server (1002). Device 1 (1007) and Device 2 (1010) may be tablets, smart phones, laptops, desktop PCs, a wearable device, such as a an interactive watch or bracelet, or any other suitable device. Alternatively, one or more of Device 1 (1007) and Device 2 (1010) may be additional e-flipcharts. The system of FIG. 10 allows users to see and collaborate on e-presentations that may be updated by a remotely connected device in real-time. The following example illustrates this concept using the components of FIG. 10.

Suppose that Device 1 (1007) is in the same physical location as the e-flipchart (1006) and Device 2 (1010) is a remote device. A presenter/user of the e-flipchart apparatus (1006) may, while editing or showing the e-presentation, invite audience members to collaborate and provide input in the form of writing or drawing into the e-presentation that has been created and is being presented on the e-flipchart apparatus. In this case, the presenter/user may provide an input that results in Device 2 (1010) being granted permission to edit the e-presentation. In such scenarios, Device 2 (1010) may connect to the e-presentation server via the network (1004), download the e-presentation, and then edit the e-presentation concurrently with Device 1 (1008) and e-flipchart apparatus (1006). When Device 2 (1010) is finished editing, the e-presentation server may delete the Device 2 Display ID. Multiple pages of the e-presentation may be shared individually, or the entirety of the e-presentation may be shared using the system of FIG. 10. Further, multiple pages of an e-flipchart apparatus may be edited in parallel, and the e-presentation server may be configured to synchronize the e-presentation when editing is completed.

In an alternative embodiment, Device 2 (1010) may display a GUI (1012) on its screen with various buttons for different functions, one of them being a button with a page flip function. Using the GUI, Device 2 (1010) may manipulate what is being displayed on the active area on the e-flipchart apparatus, without having actual editing capability. In order for Device 2 (1010) to manipulate the content displayed on the e-flipchart, Device 2 (1010) must be connected to the e-flipchart apparatus (1006) or to the e-presentation server (1002). The connection may be wireless or wired. In this scenario, the owner of the e-presentation may provide Device 2 (1010) with the GUI by providing an input that allows Device 2 viewing permissions, but not editing permissions.

Those skilled in the art will appreciate that the e-flipchart apparatus may be used in any suitable environment, for example, where traditional paper flipcharts would conventionally be useful. For example, the e-flipchart apparatus may be used in conference rooms, classrooms, boardrooms, or any other suitable environment. In one or more embodiments of the invention, the e-flipchart apparatus is designed to connect to the outside world using digital technology such as network connections, and to keep a written record of what was written on the apparatus. In addition, with the e-flipchart apparatus of the present invention, the ability to create and store a presentation before it is presented before an audience on the e-flipchart apparatus is available. For example, the e-flipchart apparatus may have removable memory on which a presentation may already be created and stored, and when the removable memory is installed into the e-flipchart apparatus, the pre-created e-presentation may be shown on the interactive display. E-presentations created using the e-flipchart apparatus may be stored, copied, shared, revised, transferred, and managed using the information described above. Moreover, because the e-flipchart apparatus uses an interactive display, it mimics the look and feel of traditional paper flipcharts.

Figure 11:
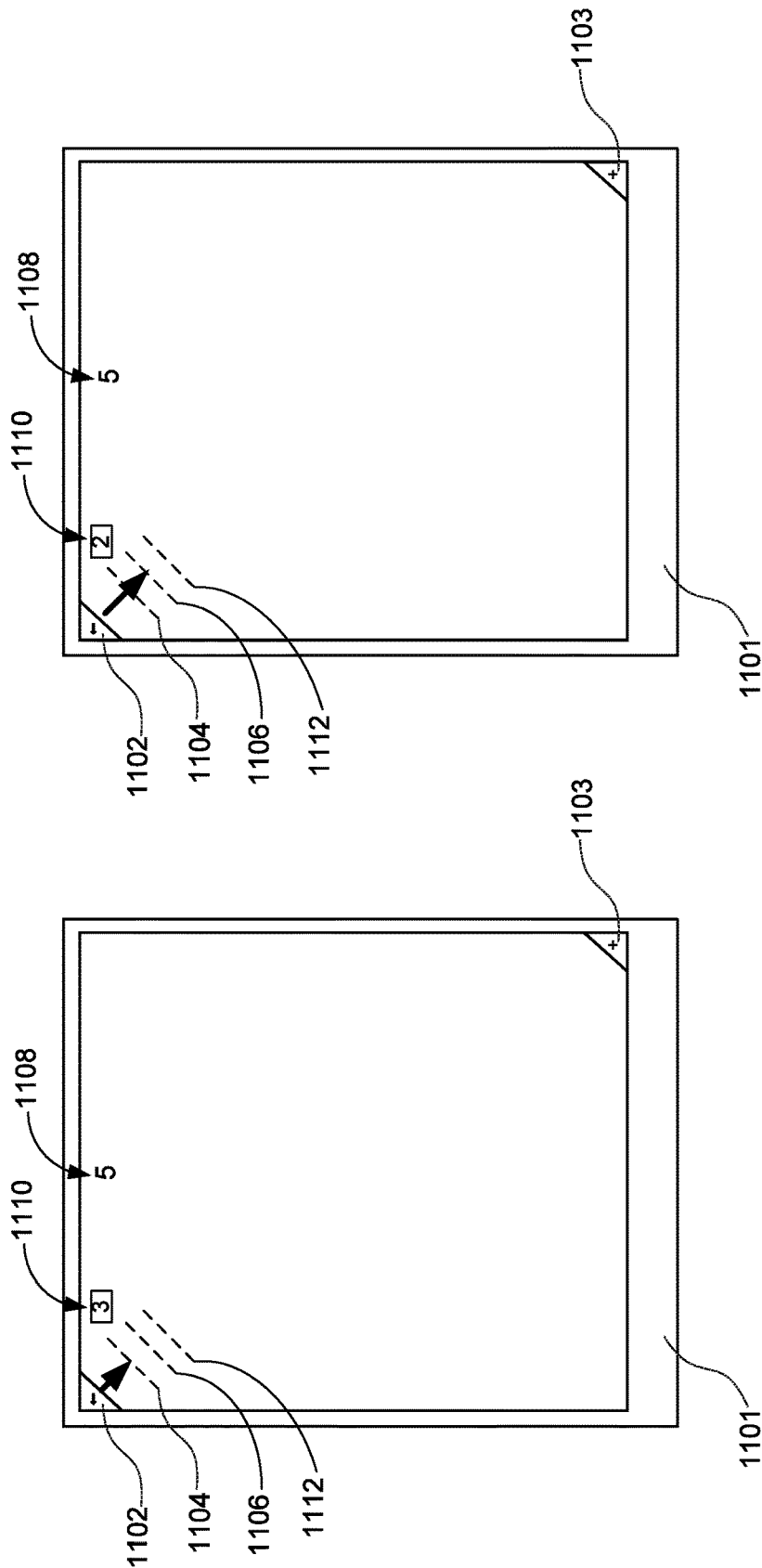
FIGS. 11A-11B show an interactive device in accordance with one or more embodiments of the invention.

FIGS. 11A-14 illustrate one or more embodiments of navigating an e-flipchart apparatus as described in FIGS. 1-10 above. Specifically, FIG. 11A-11B illustrate e-flipchart edge navigation in accordance with one or more embodiments.

In FIG. 11A, an interactive device (1101) is shown. In one or more embodiments, the interactive device (1101) may be an e-flipchart apparatus in accordance with embodiments described in FIGS. 1-10 above. Alternatively, in alternate embodiments, the interactive device may be, for example, a smart phone, a tablet, a gaming device, a laptop computer, or any other suitable interactive device with a touch display.

As described above, interactive device (1101) has an active area on which input is received and an e-presentation may be displayed. In the embodiment of FIG. 11A, page 5 (1108) of an e-presentation is displayed in the active area. Thus, the active area may display an indicator of a current page (1108) of an e-presentation when an e-presentation is being viewed/edited on the interactive device. In one embodiment of the invention The indicator may only be displayed for a period of time as opposed to being constantly displayed.

In one or more embodiments, the active area of the interactive device (1101) includes two navigation UI elements (1102, 1103) for navigating pages of the interactive device. Navigation UI element 1102 is shown in a first predetermined area as a left-hand arrow, or backward arrow, indicating navigating pages before the current page displayed on the active area. In one or more embodiments, the first predetermined area is shown as a triangle, but may be represented to a user as a triangular shaped icon, reminiscent of a curled corner of a sheet of paper, in the top left corner of the active area. Navigation UI element 1103 is shown in a second predetermined area of the active area of the interactive device. The second predetermined area is shown as a bottom right corner of the active area. In one or more embodiments, the second predetermined area is triangle that may be shown as a triangular shaped icon to the user that resembles a curled corner of a sheet of paper. Like the icon in the top left corner, in one or more embodiments of the invention, the triangular shaped icon may contain other embedded symbols, such as an arrow that indicates the direction of page navigation, or such as a plus sign, indicating navigating to pages after the current page displayed on the active area may result in the creation of a new page that does not currently exist in the e-presentation.

Those skilled in the art will appreciate that although the first and second predetermined areas are shown as triangles in diagonally opposite corners of the active area of the interactive device, these predetermined areas for displaying navigation UI elements may be positioned in other areas of the display region. For example, the triangular predetermined areas may appear on the left right corner (e.g., because the right hand is holding the digital marker). Alternatively, the backward navigation UI element (1102) may appear in the bottom left corner of the active area, for example, to aid users that may not be able to reach the top left corner of a 42 inch interactive device. Alternatively, the navigation UI elements may also appear as floating elements in other areas of the display. Further, those skilled in the art will appreciate that although the predetermined areas for displaying the navigation UI elements are depicted as triangles, they may be of any suitable shape and/or size. In addition, in one or more embodiments, the navigation UI elements (1102, 1103) may be any suitable symbol, such as, for example, a forward arrow or a plus sign for navigating forward one or more pages of the e-presentation, and a minus sign or a backward arrow for navigating backward one or more pages of the e-presentation. Further, while FIG. 11A shows two navigation UI elements, there may be any number of navigation UI elements without departing from the technology.

In one or more embodiments, navigation UI elements (1102, 1103) may enable navigation to the last page of an e-presentation, insertion of a new blank page into the current e-presentation, scrolling to a previous page, scrolling to next page (or any subsequent page), or any other actions.

In one embodiment of the invention, when performing a drag gesture, for example, up or down starting from within a particular navigation UI element (1102, 1103), a navigation aid UI element (1110) may be displayed. The page selector may include text, a number, and/or a thumbnail to aid the user with navigation within the e-presentation. That is, when the interactive device detects an input in one of the predetermined areas containing a navigation UI element, this input detection may trigger the display of a navigation aid UI element (1110).

In one or more embodiments, the predetermined areas for the display of navigation UI elements may be modified based on user preferences. Further, the navigation UI elements may not always be displayed in the active area of the interactive device. For example, the navigation UI elements may appear after an e-presentation is created or selected for editing on the interactive device. Alternatively, in one or more embodiments, the navigation UI elements may be displayed when an input action is detected by the interactive device.

In one or more embodiments, FIG. 11A shows an input action performed for navigating to a page prior to the page of the e-presentation currently being displayed. This input action is represented by the black arrow initiated in the first predetermined area displaying the backward navigation UI element (1102). In one or more embodiments, the input action may be a drag gesture that is initiated in the first predetermined area. The drag gesture may be performed by a user's fingers or using a digital marker such as that described in FIGS. 2-3 above. Alternatively, an input action may have more than one component, such as a drag portion and a release portion.

In one or more embodiments, an input action initiated in one of the predetermined areas for navigating pages of the e-presentation on the interactive device may continue until at least one predetermined navigation threshold is reached. In FIG. 11A, three predetermined navigation thresholds (1104, 1106, and 1112) are shown. In one or more embodiments, the navigation thresholds (1104, 1106, 1112) shown in FIG. 11A are virtual lines, and do not visually appear on the display area of the interactive device. In one or more embodiments, the navigation threshold may be a predetermined distance from the starting point of the input action. Thus, each navigation threshold may represent a predetermined distance from within the predetermined area displaying the navigation UI element.

In one or more embodiments, each predetermined navigation threshold may be fixed (static). Alternatively, the predetermined navigation thresholds may be dynamically set based on the starting point of the input action. For example, when the navigation threshold is a distance from the starting point of the input action, the predetermined thresholds may be dynamically set based on the distance the user's drag gesture covers initially, or based on how quickly the drag gesture covers a certain amount of distance of the display area. More specifically, in one or more embodiments, the predetermined navigation thresholds may be one or more of the following: 1) evenly spaced apart, representing the same amount of change between each threshold point, 2) unevenly spaced while still representing the same amount of change between each threshold point, 3) evenly spaced but representing different amount of jumps in value between each threshold point, or unevenly spaced apart and representing different amount of jumps in value between each threshold point.

For example, as shown in FIGS. 11A-11B, the distance between the third navigation threshold (1112) and the second navigation threshold (1106) is less than the distance between the second navigation threshold (1106) and the first navigation threshold (1104).

In another embodiment, a navigation threshold may be an elapsed time since initiation of the input action. In other words, each navigation threshold may represent a duration of the input action. For example, when the navigation threshold is an elapsed time, the predetermined thresholds may be fixed at 2 seconds, 4 seconds, and 6 seconds from initiation of the input action (e.g., the drag gesture). Thus, for example, when the navigation threshold is a duration of the input action, a first predetermined elapsed time may be 2 seconds, the second predetermined elapsed time may be 4 seconds, and the last predetermined elapsed time may be 8 seconds. In this embodiment, the longer the duration of the input action the greater the jump in pages. For example, if page 5 is currently being displayed and an input action of 4 seconds in duration is performed, then page 3 of the e-presentation may be displayed. However, if the duration of the input action is 6 seconds, then page 1 of the e-presentation may be displayed.

Those skilled in the art will appreciate that there may be two sets of navigation thresholds, one for each navigation UI element (i.e., navigating forward and backward). Alternatively, a single set of thresholds may be used, depending on which navigation UI element is invoked by a user. Further, although the navigation thresholds (1104, 1106, and 1112) are shown in FIG. 11A as being outside the predetermined area displaying the backward navigation UI element (1102), those skilled in the art will appreciate that a navigation threshold may also be inside the predetermined area on the interactive device. Said another way, the navigation thresholds may be dynamical set relative to the where the input action was initiated.

In one or more embodiments, the navigation thresholds (1104, 1106, 1112) are used to determine how many pages to navigate forward or backward. In one or more embodiments, the longer or farther the input action lasts, the more pages are "flipped" either forward or backward. Thus, for example, if the elapsed time from the start of the user's input action for navigating pages of the e-presentation crosses a first navigation threshold, then more than one page is "flipped" or navigated to. Similarly, when the elapsed time from the start of the user's input action crosses or reaches the third threshold, for example, the device may navigate to the last page of the e-presentation. In addition, in one or more embodiments, the navigation thresholds (1104, 1106, 1112) are used to determine whether to display and/or update a navigation aid UI element (1110). In one or more embodiments, the navigation aid UI element indicates to which page the device would navigate to (user "target page") if the user's input action ended at a particular navigation threshold (1104, 1106, 1112). For example, FIG. 11A depicts the drag gesture ending at first navigation threshold (1104), and the navigation aid UI element (1110) showing page 3 of the e-presentation. Thus, the first threshold (1104) results in the e-presentation being flipped two pages at once, and would result in page 3 being displayed if the input action ends at threshold 1104. In one or more embodiments of the invention (not shown), the navigation thresholds may also work in reverse when the user's drag gesture is performed in a reverse direction. For example, if the user gesture crosses a threshold that was farther then desired, the user could reverse the gesture direction, and both the navigation aid UI element and target pages would revert backwards, in proportion to the forward motion, as the gesture continues in reverse.

Similarly, FIG. 11B depicts a longer or farther input action, reaching the second predetermined navigation threshold (1106), where the navigation aid UI element (1110) shows page 2 of the e-presentation. Thus, the second navigation threshold (1106) results in the e-presentation being flipped three pages at once, and would result in page 2 being displayed if the input action ends at threshold 1106. In one or more embodiments, the navigation aid UI element may indicate a range of pages rather than a single page. In this case, when the input action ends, the display device may display a page in the range of pages indicated by the navigation aid UI element.

In one or more embodiments, when the user's input action ends before a navigation threshold is reached, then the apparatus navigates to the page of the e-presentation immediately adjacent to the current page being displayed. That is, in FIG. 11A, when the drag gesture indicated by the black arrow ends before 1104, or ends within the triangle containing navigation UI element 1102, the apparatus may navigate to page 4, which is the page that immediately precedes the current page 5 being displayed on the interactive device's display area. In such a case, when the input gesture immediately ends from the initiation point, a navigation aid UI element may not be shown to the user.

Those skilled in the art will appreciate that while the discussion of FIG. 11A-11B described examples from the perspective of navigating backward in the e-presentation, the discussion above applies equally to navigating forward in the e-presentation without departing from the scope of the invention. That is, the same type of navigation thresholds may be predetermined, and a same navigation aid UI element would be displayed near the bottom right corner of the display area of the interactive device, and the same gesture reverse action would operate. Further, although FIGS. 11A-11B show three predetermined navigation thresholds, there may be any suitable number of virtual statically or dynamically set thresholds without departing from the scope of the invention. Further, while the FIGS. 11A-11B shows navigation thresholds based on distance, embodiments of the technology may be implemented using only time-based thresholds (as discussed above).

Figure 12:
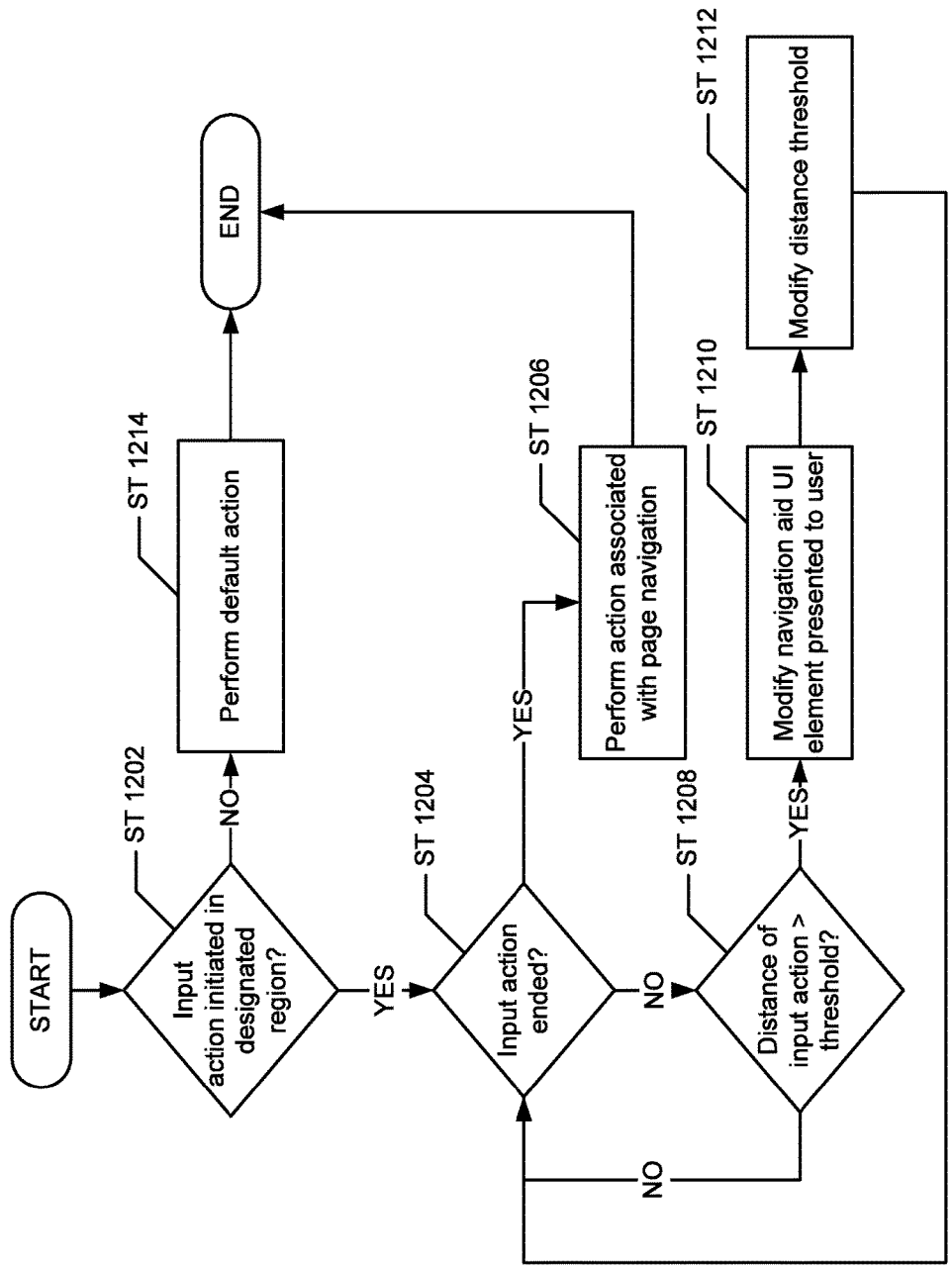
FIG. 12 shows a flow chart for navigating pages of an interactive device in accordance with one or more embodiments of the invention.

FIG. 12 shows a flow chart for navigating pages of an interactive device in accordance with one or more embodiments of the invention. More specifically, FIG. 12 shows a flow chart for navigating pages of an interactive device where the navigation threshold is a distance threshold. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 1202, a determination is made as to whether an input action initiated in a designated region. More specifically, in one or more embodiments, the interactive device determines whether an input action is initiated from at least one of the predetermined areas designated for navigation UI elements. The input action may be a drag gesture made with a user's hand or with a digital marker/stylus, a flip gesture, or any other suitable input action that indicates navigation or "flipping" of pages of an interactive device. In one or more embodiments, the predetermined areas may be designated triangular corners of interactive display area of the device, or any other shaped area at or near the edge of the display area of the interactive device.

When the input action is initiated in the designated area, a second determination is made as to whether the input action has ended (Step 1204). If the input action has ended, this indicates that the input action did not reach a predetermined navigation threshold, and thus, the interactive device performs the appropriate action to navigate to a page immediately adjacent to the currently displayed page of the e-presentation (Step 1206). In one or more embodiments, this may be the page immediately before the current page or the page immediately after the current page, depending on which predetermined area and which navigation UI element was invoked. In other words, when the input action ends immediately after initiation, the interactive device may interpret this as a single page navigation input, flipping one page either forward or backward from the currently displayed page of the e-presentation.

When the input action has not ended in Step 1204, a third determination is made as to whether the distance of the continuing input action exceeds a distance navigation threshold (Step 1208). The distance may be measured in millimeters, centimeters, inches, or any other suitable measurement unit. In one or more embodiments, when the input action, such as a drag gesture, does not immediately end, the process begins to determine which virtual navigation threshold, if any, is reached by the input action. When the distance of the input action exceeds a predetermined distance threshold, in Step 1210, the navigation aid UI element is modified to indicate to which page (forward/backward) the interactive device would navigate to if the input action ended at the current distance navigation threshold. That is, the page displayed by the navigation aid UI element is updated to reflect one or more pages before/after the page immediately adjacent to the current page that would be navigated to based on how far the distance of the input action has reached.

Those skilled in the art will appreciate that the navigation UI element is modified and displayed to the user on the display area of the interactive device, but the page is not actually navigated to or displayed as the current page until the input action ends. Thus, the user is able to see, via the navigation aid UI element, what page would be displayed if the input action is completed at that distance from the initiation point, before the input action is actually completed. Further, in one or more embodiments, the user may reverse the input action (e.g., drag gesture) direction and cross a threshold in the reverse direction to effectively "undo" navigation.

At this stage, the distance navigation threshold is modified (Step 1212). Specifically, in one or more embodiments, when the input action has not ended and a predetermined distance navigation threshold is exceeded, the distance navigation threshold is updated to a new distance should the input action continue. The new distance threshold is farther away from the starting point of the input action within the predetermined navigation area, and results in the navigation forward/backward of more pages of the e-presentation.

After the distance navigation threshold is modified, the process returns to Step 1204, to determine if the input action has ended. If the action has ended, then in Step 1206, the page indicated by the updated navigation aid UI element is displayed as the current page on the interactive device. In other words, the interactive device navigates to the page reached by the distance of the input action. If the input action has not ended, the process continues, and Steps 1208-1212 repeat (i.e., a next predetermined distance threshold is reached, the navigation aid UI element is modified again, and another navigation distance threshold may be dynamically set), until the input action ends.

Returning to Step 1202, when the input action is not initiated in the designated region for page navigation, a default action may be performed, such as a selection action (Step 1214). Specifically, in one or more embodiments, if an input action such as a drag gesture or any other suitable input action is initiated outside of the predetermined area having navigation UI elements, then the interactive device may interpret that input action as a selection action for selecting text or other displayed data. That is, the text or other display data may be selected in some way, such as highlighting the text over which the input action is performed. Those skilled in the art will appreciate that other default actions may also be performed when the input action is initiated outside of the predetermined navigation area without departing from the scope of the invention.

Figure 13:
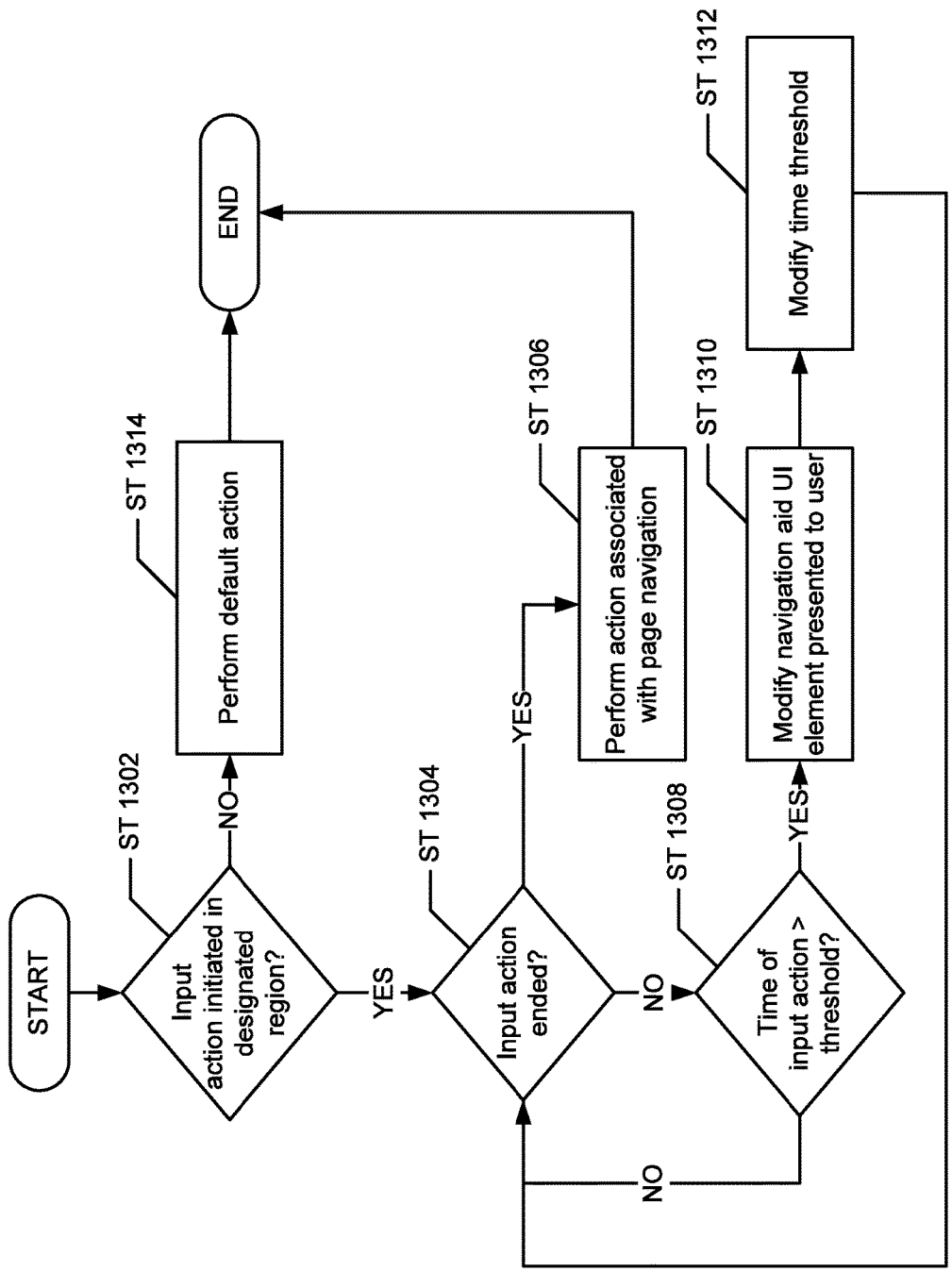
FIG. 13 shows a flowchart for navigating pages of interactive device in accordance with one or more embodiments of the invention.

FIG. 13 shows a flow chart for navigating pages of an interactive device in accordance with one or more embodiments of the invention. More specifically, FIG. 13 shows a flow chart for navigating pages of an interactive device where the navigation threshold is an elapsed time navigation threshold. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 1302, a determination is made as to whether an input action initiated in a designated region. More specifically, in one or more embodiments, the interactive device determines whether an input action is initiated from at least one of the predetermined areas designated for navigation UI elements. The input action may be a drag gesture made with a user's hand or with a digital marker/stylus, a flip gesture, or any other suitable input action that indicates navigation or "flipping" of pages of an interactive device. In one or more embodiments, the predetermined areas may be designated triangular corners of interactive display area of the device, or any other shaped area at or near the edge of the display area of the interactive device.

When the input action is initiated in the designated area, a second determination is made as to whether the input action has ended (Step 1304). If the input action has ended, this indicates that the input action did not reach a predetermined navigation threshold, and thus, the interactive device performs the appropriate action to navigate to a page immediately adjacent to the currently displayed page of the e-presentation (Step 1306). In one or more embodiments, this may be the page immediately before the current page or the page immediately after the current page, depending on which predetermined area and which navigation UI element was invoked. In other words, when the input action ends immediately after initiation, the interactive device may interpret this as a single page navigation input, flipping one page either forward or backward from the currently displayed page of the e-presentation.

When the input action has not ended in Step 1304, a third determination is made as to whether an elapsed time of the continuing input action exceeds a duration navigation threshold (Step 1308). In one or more embodiments, when the input action, such as a drag gesture, does not immediately end, the process begins to determine which virtual navigation threshold, if any, is reached by the input action. When the elapsed time since initiation of the input action exceeds a predetermined duration, in Step 1310, the navigation aid UI element is modified to indicate to which page (forward/backward) on the interactive device would navigate to if the input action were to end at the current elapsed time. That is, the page displayed by the navigation aid UI element is updated to reflect one or more pages before/after the page immediately adjacent to the current page that would be navigated to based on the elapsed time (e.g., in seconds) since the start of the input action. Those skilled in the art will appreciate that the navigation UI element is modified and displayed to the user on the display area of the interactive device, but the page is not actually navigated to or displayed as the current page until the input action ends. Thus, the user is able to see, via the navigation aid UI element, what page would be displayed if the input action is completed at that point in time, before the input action is actually completed.

At this stage, the duration threshold is modified (Step 1312). Specifically, in one or more embodiments, when the input action has not ended and a predetermined duration navigation threshold is exceeded, the duration navigation threshold is updated to a new elapsed time that triggers an update to the navigation of pages, should the input action continue. The new duration threshold is a longer elapsed time since the initiation of the input action within the predetermined navigation area, and results in the navigation forward/backward of more pages of the e-presentation.

After the duration navigation threshold is modified, the process returns to Step 1304, to determine if the input action has ended. If the action has ended, then in Step 1306, the page indicated by the updated navigation aid UI element is displayed as the current page on the interactive device. In other words, the interactive device navigates to the page reached by the distance of the input action. If the input action has not ended, the process continues, and Steps 1308-1312 repeat (i.e., a next predetermined distance threshold is reached, the navigation aid UI element is modified again, and another navigation distance threshold may be dynamically set), until the input action ends.

Returning to Step 1302, when the input action is not initiated in the designated region for page navigation, a default action may be performed, such as a selection action (Step 1314). Specifically, in one or more embodiments, if an input action such as a drag gesture or any other suitable input action is initiated outside of the predetermined area having navigation UI elements, then the interactive device may interpret that input action as a selection action for selecting text or other displayed data. That is, the text or other display data may be selected in some way, such as highlighting the text over which the input action is performed. Those skilled in the art will appreciate that other default actions may also be performed when the input action is initiated outside of the predetermined navigation area without departing from the scope of the invention.

The following examples illustrate embodiments of the invention and are not meant to limit the scope of the invention in any way.

Figure 14B:
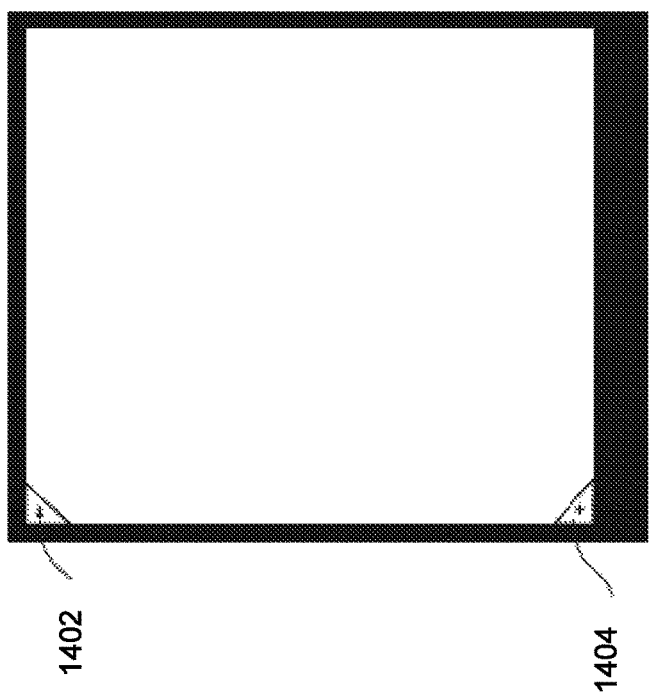
Figure 14A:
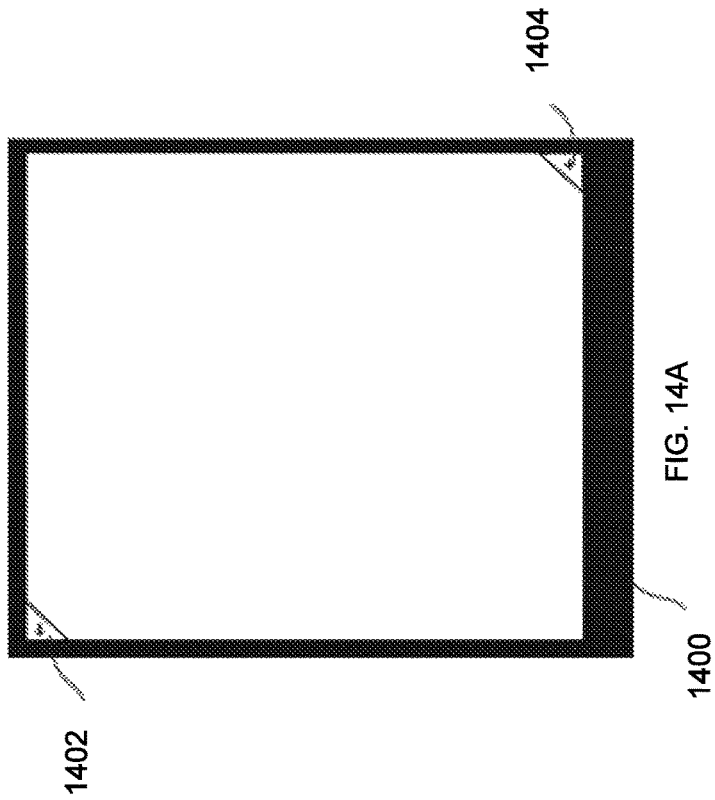

FIGS. 14A-14B shows how the UI elements (1402, 1404) may be customized depending on the user's individual needs. FIG. 14A shows a backward navigation UI element (1402) as a backward pointing arrow in the top left corner of the display area of the interactive device (1400). A forward navigation UI element (1404) is shown in the bottom right corner of the display area, as a plus sign. In this case, the plus sign could be used to indicate that no further page currently exists in the e-presentation, and navigating forward will result in a new page being created. In FIG. 14B, the forward navigation UI element (1404) is shown in a different position, i.e., the bottom left corner of the display area of the interactive device (1400).

Those skilled in the art will appreciate that user-selectable modifications to the various navigation UI elements are not limited to the location of the UI element on the display area. The user may customize the size, shape, location, color, embedded icons, or any other suitable display property of the navigation UI elements without departing from the scope of the invention.

Figure 14D:
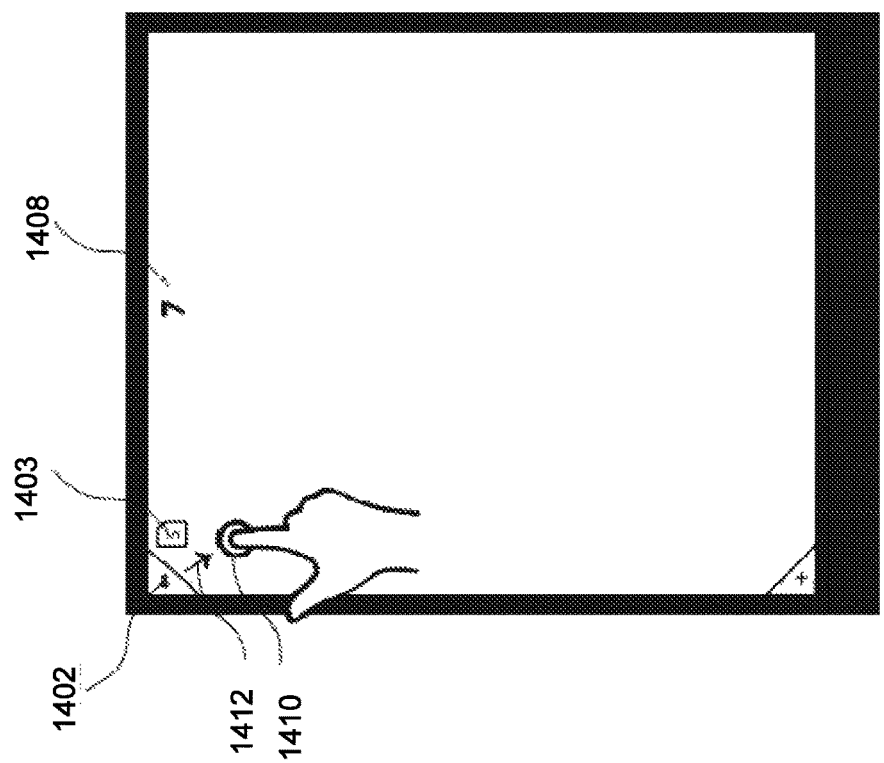
Figure 14C:
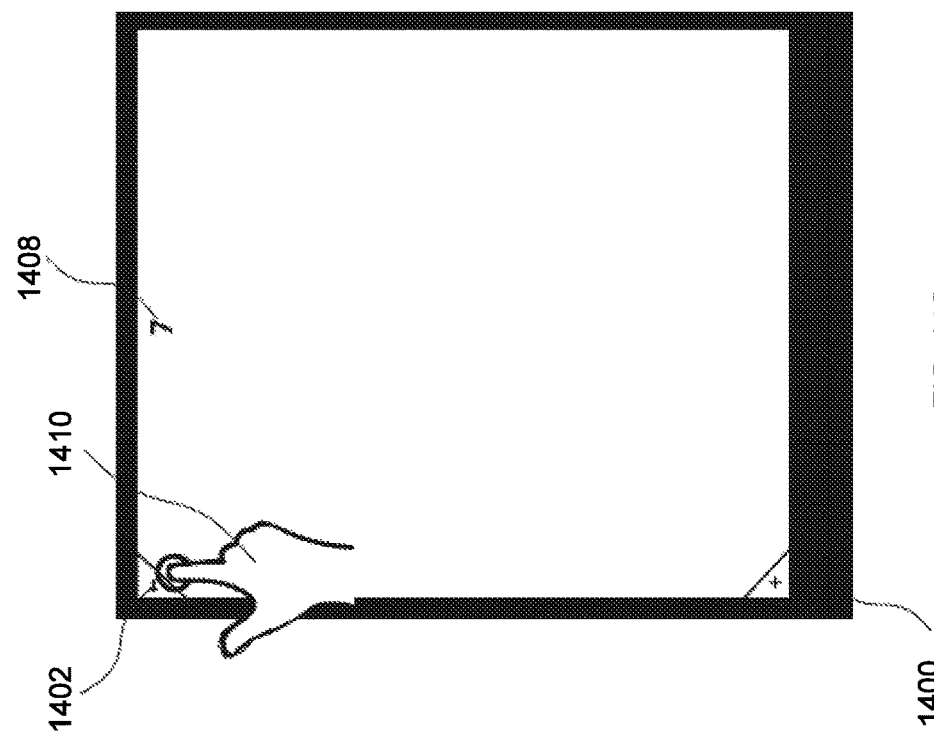

FIG. 14C shows the interactive device (1400) currently displaying page number 7 (1408). In one or more embodiments, if the user wants to navigate backward, the user may tap or perform a quick drag gesture (i.e., without exceeding a virtual navigation threshold) with his/her finger (1410), or use of a digital marker, at the backward navigation UI element (1402) to navigate back a single page of an e-presentation. In one or more embodiment, the input action must begin in the designated area for the backward navigation UI element, shown in FIG. 14C as a triangular area in the corner of the display area of the interactive device. In one or more embodiments, when the input action does not originate in one of the designated areas for forward or backward navigation, the input action may be interpreted as some other default action not involving navigation of pages of an e-presentation or other document.

With reference to FIG. 14D, when the user wants to navigate backward more than a single page, for example, the user may slide or drag (1412) his/her finger (1410), starting from the backward navigation UI element (1402), diagonally toward the center of the display area, without immediately releasing (1410). That is, in one or more embodiments, the input action detected by the interactive device exceeds a static or dynamically set navigation threshold of e.g., duration of the input since the starting point, or the distance/length of the input action. When such an input action occurs, a navigation aid UI element (1403) may appear on the display area of the device (1400). In the example of FIG. 14D, the navigation aid UI element (1403) indicates that the range of the slide or drag input action would result in navigation backward to page 5, or two pages back from the currently displayed page 7 (1408).

In one or more embodiments, the navigation aid UI element (1403) may be a character, a number, a thumbnail, an icon, or any other suitable indicator representing where the interactive device may navigate to based on at least one navigation threshold associated with the input action. When the user desires to navigate backward only a few pages, for example, he/she may slide/drag a small distance, or for a short amount of time.

Alternatively, if the user desires to navigate backward many pages, then he or she may slide a longer distance (1414, 1416) or for a longer period of time as shown in FIG. 14E. In this case, the navigation aid UI element (1403) is updated from the page indicated in FIG. 14D, in order to display to the user that the longer range of the slide or drag input action results in navigation backward to page 1 of the e-presentation, or 6 pages back from the currently displayed page 7 (1408).

Figure 14H:
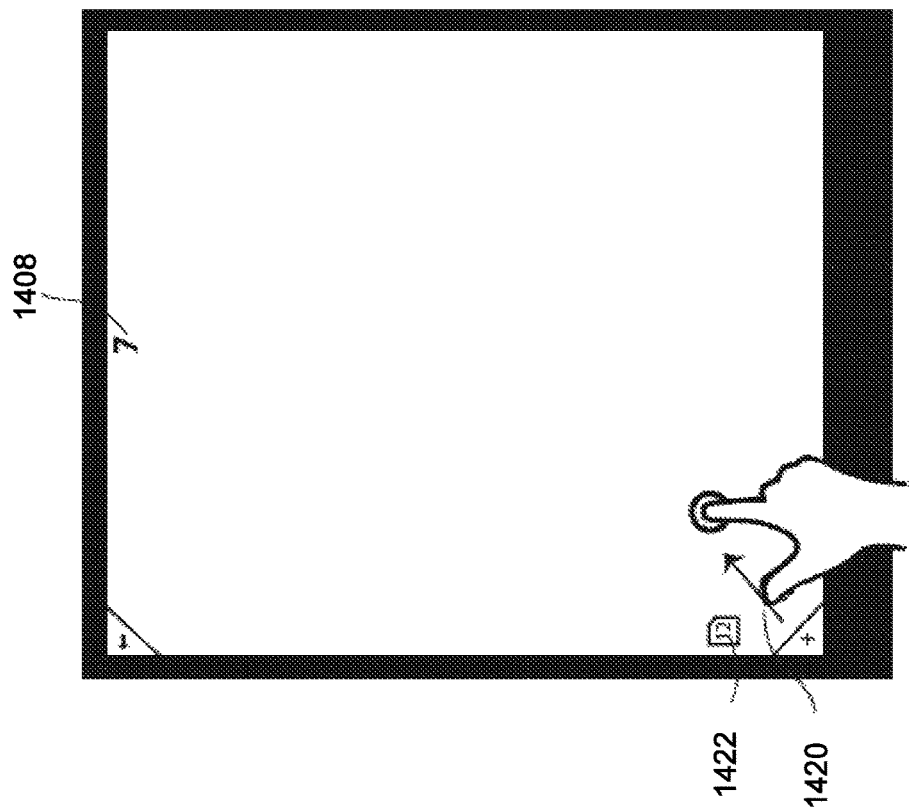
Figure 14G:
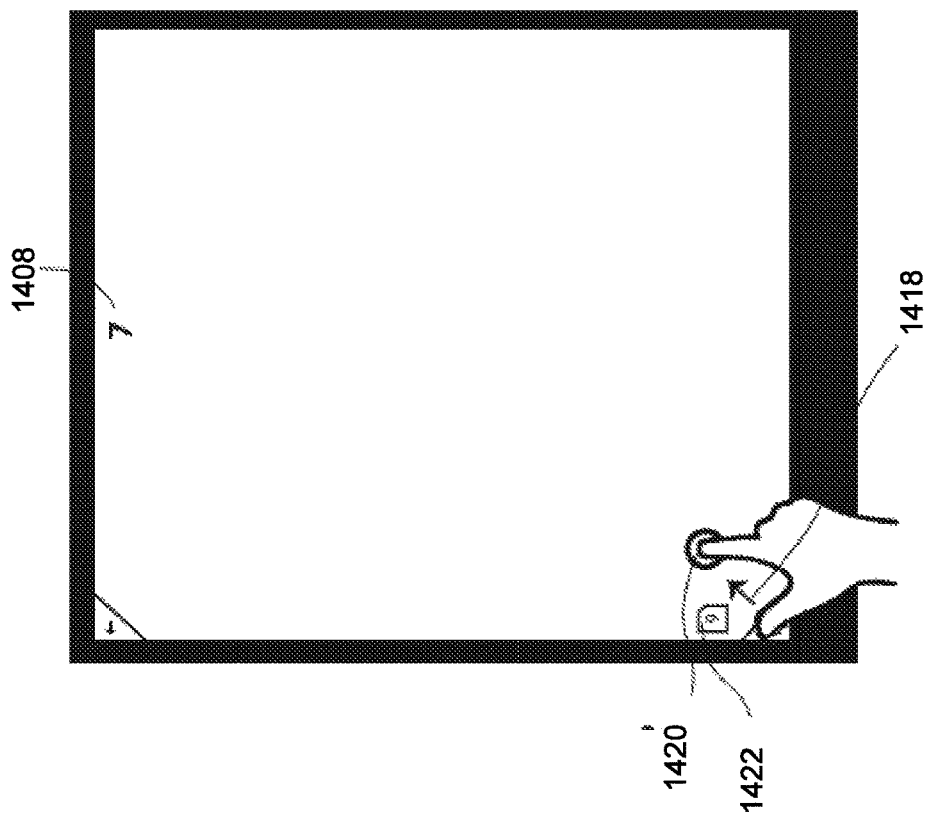

FIGS. 14F-14H show the same process for navigating forward on the device (1400), again, mimicking the motion of a traditional paper flipchart. In FIG. 14F, the user (1410) may touch, click, or slide/drag for a very short duration on the plus sign navigation UI element to navigate forward a single page. Again, the input action must begin in the designated area for the forward navigation UI element. In FIG. 14G, the user (1410) may slide without immediately releasing the touch input, from the plus sign UI element (note shown) diagonally toward the center of the display area (1418, 1420), so that the navigation aid UI element (1422) appears. That is, in one or more embodiments, the input action detected by the interactive device exceeds a static or dynamically set navigation threshold of e.g., duration of the input since the starting point, or the distance/length of the input action. In the example of FIG. 14G, the navigation aid UI element (1422) appears near the designated area for the forward navigation UI element. However, in the example of FIG. 14G and the examples discussed above, the navigation aid UI element may appear elsewhere on the display area of the interactive device, such as near the current page display indicator. As shown in FIG. 14H, by lengthening or increasing the duration of the slide range (1420), the user may navigate more pages forward.

Those skilled in the art will appreciate that the user is not limited to sliding diagonally toward the center of the display area of the device as shown in the examples of FIGS. 14A-14H. Rather, the slide/drag action, or other input action, may be performed straight upward, downward, to the left or to the right of the respective navigation UI elements. Further, the input action may be reversed mid-gesture to "undo" the effect of the navigation (e.g., so a user could move back and forth to have the navigation aid UI element zero in on an exact desired page).

Further, although not shown in the examples of FIG. 14A-14H, those skilled in the art will appreciate that when the slide/drag action for navigating more than one page ends, the page indicated by the navigation aid UI element is displayed on the interactive device.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform one or more embodiments of the inventions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
a memory configured to store an e-presentation comprising a plurality of pages; and
an interactive display, comprising:
a predetermined area of the interactive display, wherein the predetermined area is a right corner of the interactive display;
wherein the interactive display is configured to:
display a first page of the plurality of pages of the e-presentation, wherein the first page is associated with a first page number;
detect a first input from a user;
make a first determination that the first input initiated in the first predetermined area; and
in response to the first determination:
display a first user interface (UI) element on the interactive display, wherein the first UI element is a second page number consecutively after the first page number; and
make a second determination that the first input exceeds a first elapsed time threshold;
in response to the second determination:
update the first UI element to a third page number, wherein the third page number is greater than the second page number; and
obtain a second elapsed time threshold, wherein the second elapsed time threshold is greater than the first elapsed time threshold;
make a third determination that the first input no longer exists prior to an expiration of the second elapsed time threshold; and
in response to the third determination:
display a second page of the plurality of pages of the e-presentation, wherein the second page is associated with the third page number.

2. The apparatus of claim 1, wherein the first input is a drag gesture initiating from within the predetermined area.

3. A non-transitory computer readable medium comprising instructions, which when executed by a processor perform a method for navigating pages on an apparatus configured to store an e-presentation, the method comprising:
displaying, on an interactive display of the apparatus, a first page of a plurality of pages of the e-presentation, wherein the first page is associated with a first page number;
wherein the interactive display comprises:
a predetermined area, wherein the predetermined area is a right corner of the interactive display;
detecting a first input from a user;
making a first determination that the first input initiated in the first predetermined area; and
in response to the first determination:
displaying a first user interface (UI) element on the interactive display, wherein the first UI element is a second page number consecutively after the first page number; and
making a second determination that the first input exceeds a first elapsed time threshold;
in response to the second determination:
updating the first UI element to a third page number, wherein the third page number is greater than the second page number; and
obtain a second elapsed time threshold, wherein the second elapsed time threshold is greater than the first elapsed time threshold;
making a third determination that the first input no longer exists prior to an expiration of the second elapsed time threshold; and
in response to the third determination:
page number; and
displaying a second page of the plurality of pages of the e-presentation, wherein the second page is associated with the third page number.

4. The apparatus of claim 1, wherein the predetermined area is a triangular region in the right corner.

5. The apparatus of claim 1, wherein a first gap between the second page number and the third page number is proportional to a second gap between the first elapsed time threshold and the second elapsed time threshold.

6. The apparatus of claim 1, wherein a first gap between the second page number and the third page number is not proportional to a second gap between the first elapsed time threshold and the second elapsed time threshold.

7. The apparatus of claim 1, wherein a gap between the first elapsed time threshold and the second elapsed time threshold is based on exponential spacing.

8. The apparatus of claim 1, wherein a gap between the first elapsed time threshold and the second elapsed time threshold is based on even spacing.

9. The apparatus of claim 1, wherein a gap between the second page number and the third page number is based on exponential spacing.

10. The apparatus of claim 1, wherein a gap between the second page number and the third page number is based on even spacing.

11. The apparatus of claim 3, wherein a first gap between the second page number and the third page number is proportional to a second gap between the first elapsed time threshold and the second elapsed time threshold.

12. The apparatus of claim 3, wherein a first gap between the second page number and the third page number is not proportional to a second gap between the first elapsed time threshold and the second elapsed time threshold.

13. The apparatus of claim 3, wherein a gap between the first elapsed time threshold and the second elapsed time threshold is based on exponential spacing.

14. The apparatus of claim 3, wherein a gap between the first elapsed time threshold and the second elapsed time threshold is based on even spacing.

15. The apparatus of claim 3, wherein a gap between the second page number and the third page number is based on exponential spacing.

16. The apparatus of claim 3, wherein a gap between the second page number and the third page number is based on even spacing.

* * * * *

UNITED STATES PATENT AND TRADEMARK OFFICE
CERTIFICATE OF CORRECTION

PATENT NO. : 10,430,053 B1  
APPLICATION NO. : 15/398158  
DATED : October 1, 2019  
INVENTOR(S) : Christopher Bradley Spaidal et al.

Page 1 of 1

It is certified that error appears in the above-identified patent and that said Letters Patent is hereby corrected as shown below:

In the Claims

Claim 3, Column 25, Line 56, the phrase "the first predetermined area" should read --the predetermined area--.

Signed and Sealed this
Tenth Day of December, 2019

Andrei Iancu
*Director of the United States Patent and Trademark Office*